(12) United States Patent
Kobayashi et al.

(10) Patent No.: US 6,807,003 B2
(45) Date of Patent: Oct. 19, 2004

(54) OPTICAL SHEET, OPTICAL SHEET MANUFACTURING SYSTEM, AND OPTICAL SHEET CUTTING MACHINE

(75) Inventors: Hiroyoshi Kobayashi, Hachioji (JP); Kazuya Yamanaka, Hachioji (JP); Masakatsu Ohuchi, Ebina (JP); Isao Doshida, Yokohama (JP)

(73) Assignee: Olympus Optical Co., Ltd., Tokyo (JP)

( * ) Notice: Subject to any disclaimer, the term of this patent is extended or adjusted under 35 U.S.C. 154(b) by 169 days.

(21) Appl. No.: 10/025,312

(22) Filed: Dec. 19, 2001

(65) Prior Publication Data

US 2002/0122250 A1 Sep. 5, 2002

(30) Foreign Application Priority Data

Dec. 26, 2000 (JP) ......................................... 2000-395631

(51) Int. Cl.[7] ........................... G03B 21/60; G02B 27/10
(52) U.S. Cl. ........................................ 359/455; 359/621
(58) Field of Search .................................. 359/455, 456, 359/457, 619, 621, 449

(56) References Cited

U.S. PATENT DOCUMENTS

| | | | | |
|---|---|---|---|---|
| 5,121,252 A | * | 6/1992 | Okada et al. ............... | 359/455 |
| 5,186,780 A | * | 2/1993 | Sakunaga et al. ........... | 359/456 |
| 5,206,761 A | * | 4/1993 | Ogino ......................... | 359/457 |
| 2002/0012166 A1 | * | 1/2002 | Nakamura .................. | 359/460 |

FOREIGN PATENT DOCUMENTS

| | | |
|---|---|---|
| JP | 64-23042 U | 2/1989 |
| JP | 5-80420 A | 4/1993 |
| JP | 6-82917 A | 3/1994 |
| JP | 2001-174921 A | 6/2001 |

OTHER PUBLICATIONS (Technical Data) Surface Roughness, Excerpt from JIS B 0601 and JIS B 0031 (1994), p. 1381.*

* cited by examiner

*Primary Examiner*—Christopher E Mahoney
(74) *Attorney, Agent, or Firm*—Frishauf, Holtz, Goodman & Chick, P.C.

(57) ABSTRACT

An optical sheet to be used as a screen on which an image is projected from an image projector is provided. The optical sheet is produced by joining a plurality of optical sheet members with end surfaces thereof meeting each other as joint surfaces. The optical sheet members are realized with lenticular lens sheets. Each lenticular lens sheet has lenses, which are elongated in a second direction, juxtaposed in a first direction orthogonal to the second direction. The optical properties of the optical sheet members that are slightly undulated vary cyclically in the first direction. And the optical sheet members to be joined are a selected pair of optical sheet members whose undulations are substantially identical to each other or symmetrical to each other with respect to the joint surfaces.

9 Claims, 16 Drawing Sheets

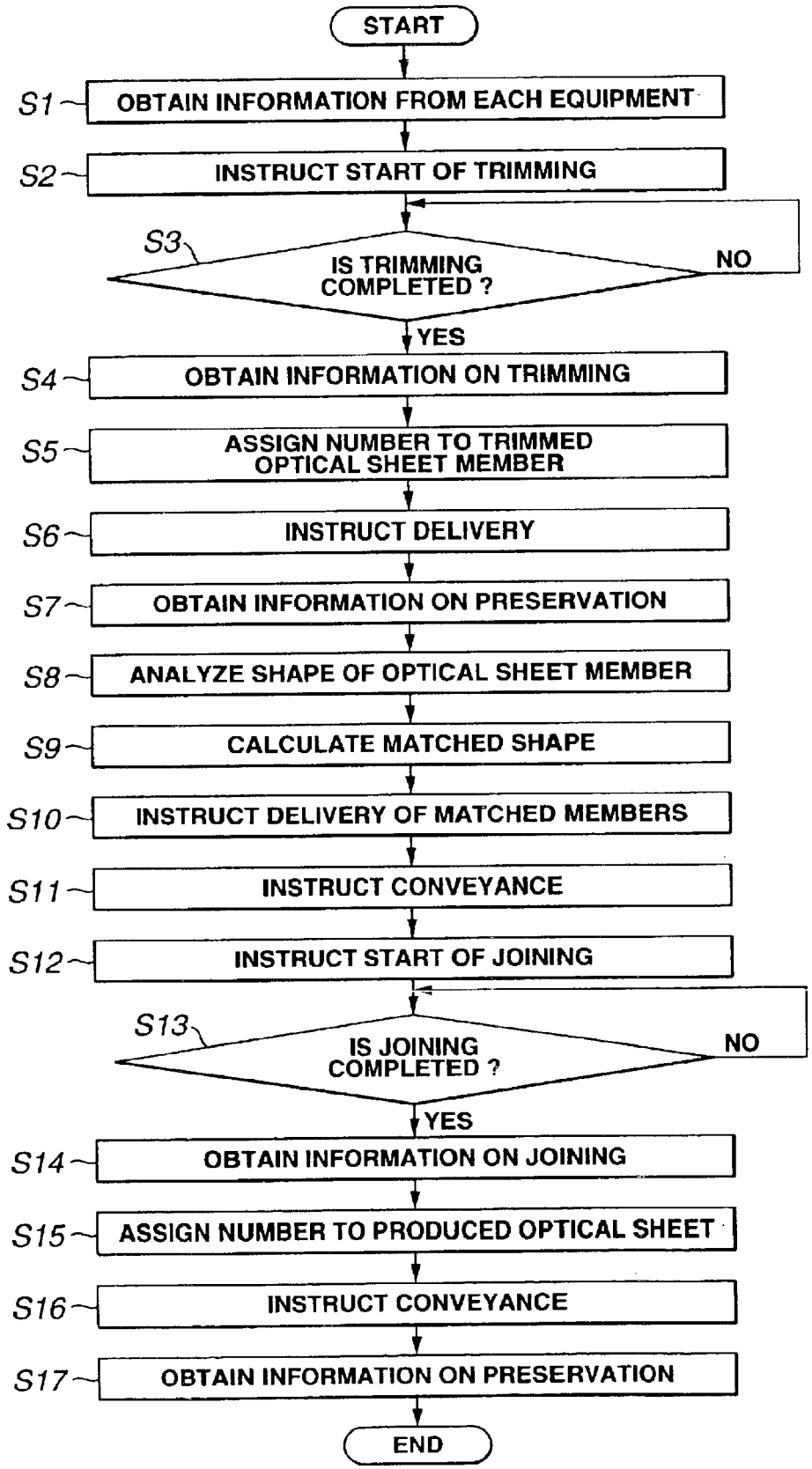

FIG.11A
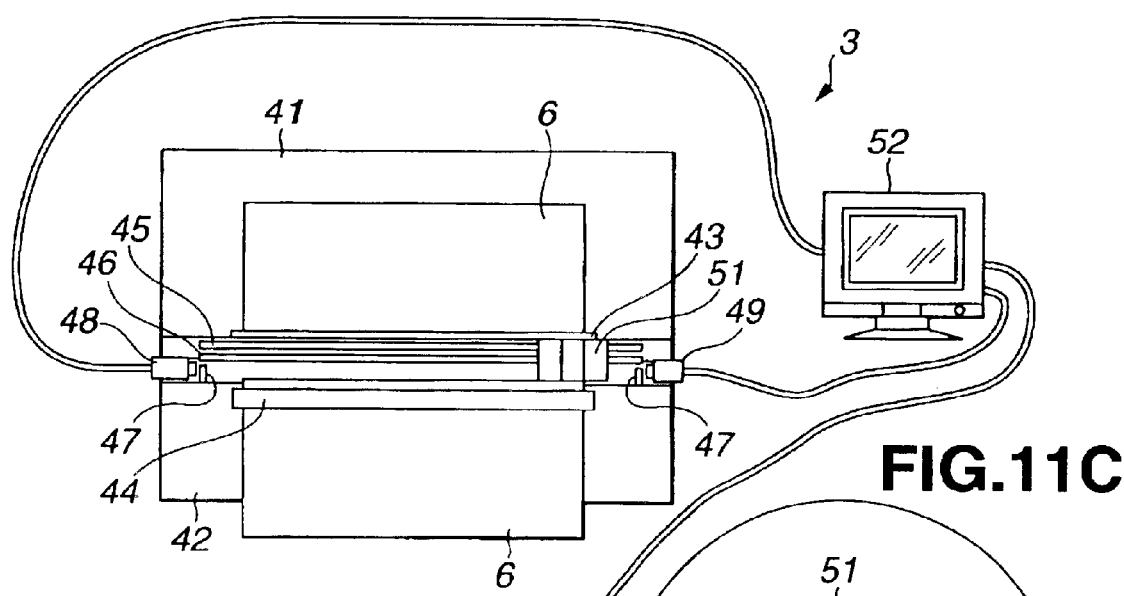
FIG.11B
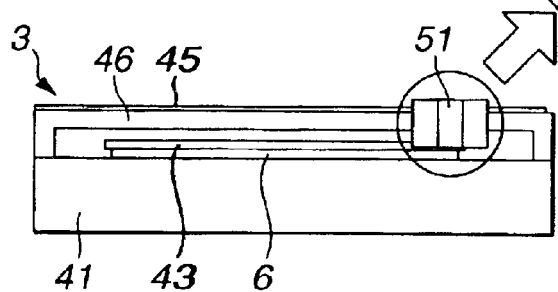
FIG.11C

FIG.18A FIG.18B
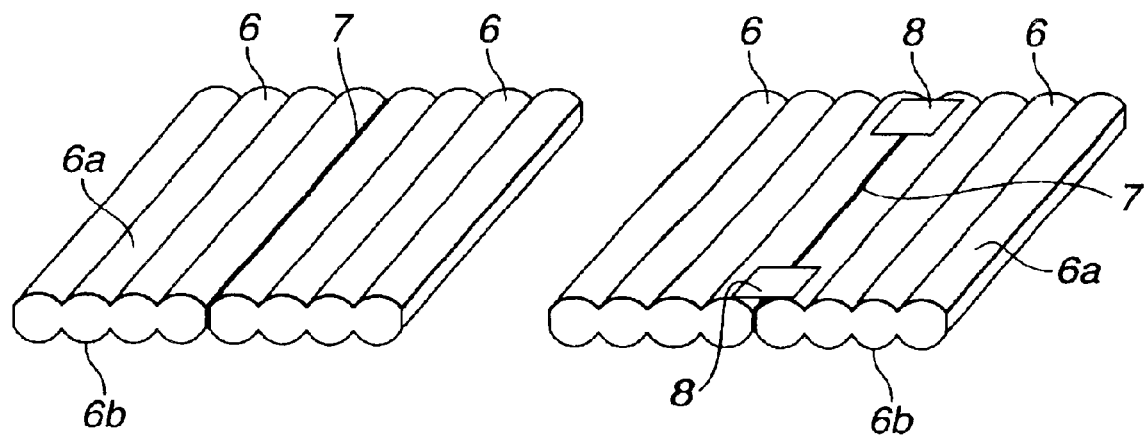
FIG.19
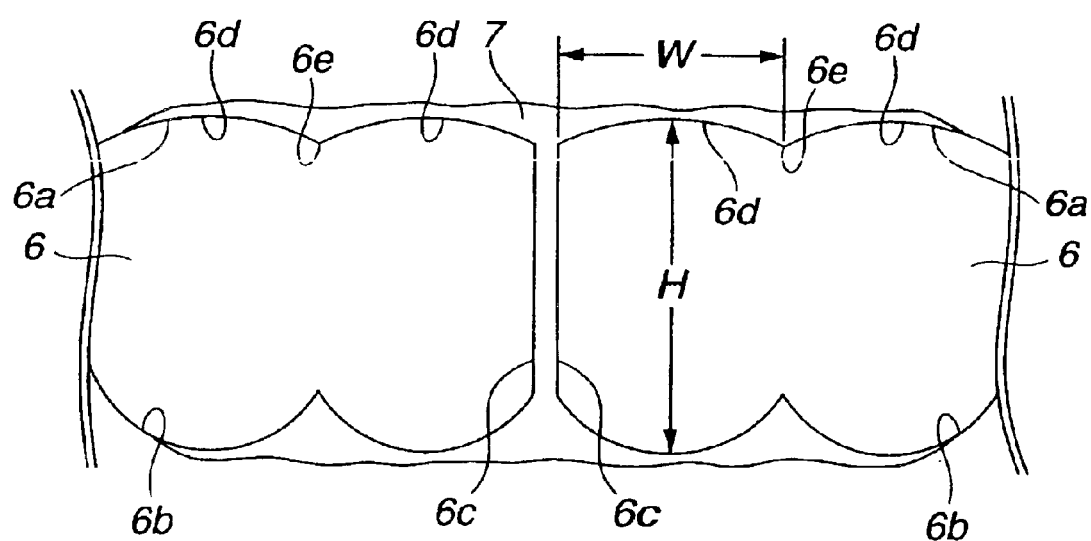

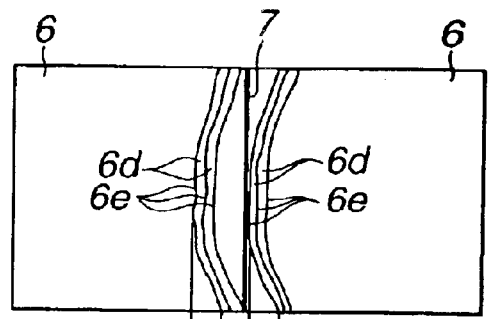
FIG.20A
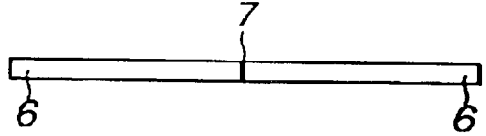
FIG.20B
FIG.21A         FIG.21C
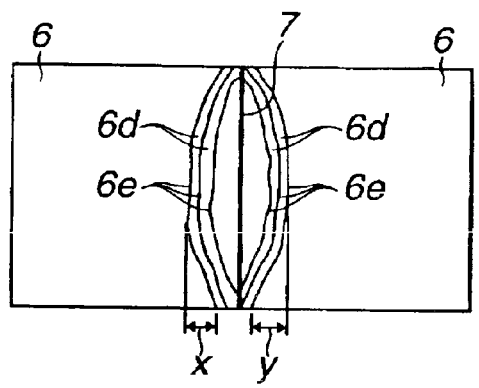   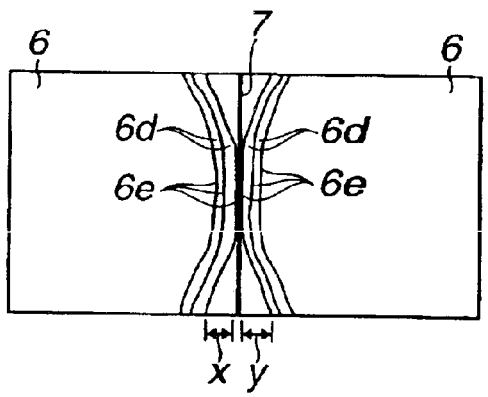
FIG.21B         FIG.21D
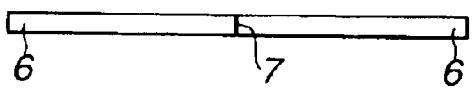   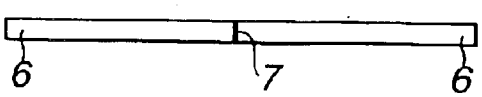

OPTICAL SHEET, OPTICAL SHEET MANUFACTURING SYSTEM, AND OPTICAL SHEET CUTTING MACHINE

This application claims the benefit of Japanese Application No. 2000-395631 filed in Japan on Dec. 26, 2000, the contents of which are incorporated by reference.

BACKGROUND OF THE INVENTION

1. Field of the Invention

The present invention relates to an optical sheet having a plurality of optical sheet members joined, an optical sheet manufacturing system for manufacturing the optical sheet, and an optical sheet cutting machine.

2. Description of the Related Art

Optical sheets including the one realized with a lenticular lens sheet and the one realized with a Fresnel lens sheet are adopted as an optical screen on which an image is projected from an image projector. There is a tendency towards a large optical screen in pursuit of large-screen vision of an image. Accordingly, optical sheets with larger areas are in need.

Among the optical sheets, for example, the optical sheet realized with a lenticular lens sheet is structured to have semi-cylindrical projections successively arranged on the surface thereof. A transparent resin material that is heated and softened is rolled out using a roller member that has numerous female semi-cylindrical molds inscribed on the peripheral surface thereof, whereby the lenticular lens sheet is produced.

However, considerable pressure must be applied in order to produce a thin lenticular lens sheet. When an attempt is made to increase the width of a lenticular lens sheet with the thinness maintained, required pressure becomes so high that the rigidity of a manufacturing unit must be raised markedly. This leads to the high costs of manufacturing.

Therefore, a technology for producing a lenticular lens sheet of a large area at low costs by joining lenticular lens sheets of a predetermined width has been developed.

For example, Japanese Unexamined Utility Model Application Publication No. 64-23042 describes a transmissive screen having a plurality of transparent or translucent resin sheets joined. Adjoining of the plurality of resin sheets is made with resin layers, of which optical property is substantially identical to that of the resin sheets, between the resin sheets. More particularly, the resin sheets are realized with lenticular lens sheets, and the lenticular lens sheets are joined at their depressions.

However, the lenticular lens sheet is, as mentioned above, produced by rotating a roller member and pressing it against a resin material. In practice, it is unavoidable that minute undulations occur on the surface of the lenticular lens sheet whose surface is realized with the repetition of a depression and an elevation.

If lenticular lens sheets each having the undulations are joined as they are, a mismatch caused by the undulations produces an optically adverse effect. Consequently, the joint portions of the lenticular lens sheets are visualized as a streak.

Therefore, there is a demand for a technology that takes account the undulations in optical sheet members and prevents them from producing an optically adverse effect.

SUMMARY OF THE INVENTION

Accordingly, an object of the present invention is to provide an optical sheet in which joint portions of optical sheet members will produce almost no optically adverse effect.

Another object of the present invention is to provide an optical sheet manufacturing system optimal for manufacturing of an optical sheet in which joint portion of optical sheet members will produce almost no optically adverse effect.

Still another object of the present invention is to provide an optical sheet cutting machine capable of cutting an optical sheet member optimally for joining that will almost not permit joint portions of optical sheet members to produce an optically adverse effect.

Briefly, according to the present invention, there is provided an optical sheet to be used as a screen on which an image is projected from an image projector. The optical sheet has a plurality of optical sheet members which are joined together with end surfaces thereof, which are orthogonal to major surfaces thereof. The optical sheet members are substantially identical to each other to such an extent that the optical property of each optical sheet member changes cyclically in a first direction over the major surface of the optical sheet member, and that undulations exist in a second direction orthogonal to the first direction. One optical sheet member and the other optical sheet member that are to be joined with the joint surfaces thereof are optical sheets whose optical properties exhibited over the joint surfaces are substantially identical to each other within a predetermined permissible range.

Moreover, according to the present invention, there is provided an optical sheet manufacturing system consisting mainly of an optical sheet cutting machine, an optical sheet joining machine, a reservoir, a conveying machine, and a controller. The optical sheet cutting machine trims an optical sheet member optimally for joining. The optical sheet joining machine joins a plurality of optical sheet members with the edges thereof, which have been cut optimally for joining, met each other. At least one of the optical sheet members cut by the optical sheet cutting machine and the optical sheet produced by the optical sheet joining machine is preserved in the reservoir. The conveying machine conveys optical sheet members among the optical sheet cutting machine, optical sheet joining machine, and reservoir. The controller controls the optical sheet cutting machine, reservoir, optical sheet joining machine, and conveying machine.

Furthermore, according to the present invention, there is provided an optical sheet cutting machine consisting mainly of a platform, an investigating device, a cutting blade, a cutting drive source, and a feeding drive source. An optical sheet member to be cut is placed on the platform, and the platform enables adjustment of a slide position and a turn position on the major surface of the optical sheet member. The investigating device investigates the shape of the surface of the optical sheet member placed on the platform so as to determine a cutting band line along which the optical sheet member is cut. The cutting blade is used to trim the optical sheet member. The cutting drive source drives the cutting blade at the same cutting start position. The feeding drive source moves the cutting blade to change the cutting start position. The platform is used to adjust the slide position and turn position on the optical sheet member so that a path along which the cutting blade is moved by the feeding drive source will agree with the cutting band line determined based on the investigation performed by the investigating device. While the cutting drive source is driving the cutting blade, the feeding drive source moves the cutting blade along the cutting band line. The optical sheet member is thus cut.

The above and other objects, features and advantages of the invention will become more clearly understood from the following description referring to the accompanying drawings.

BRIEF DESCRIPTION OF THE DRAWINGS

FIG. 3 is a flowchart describing the actions of the optical sheet manufacturing system in accordance with the embodiment;

FIG. 11A is a plan view showing the structure of an optical sheet joining machine included in the embodiment;

FIG. 11B is a front view showing the structure of the optical sheet joining machine included in the embodiment;

FIG. 11C is an enlarged partial view showing the structure of the optical sheet joining machine included in the embodiment;

FIG. 18A and FIG. 18B are perspective views showing the appearance of joined optical sheet members employed in the embodiment;

FIG. 19 is an enlarged view showing the states of joint portions of optical sheet members employed in the embodiment;

FIG. 20A and FIG. 20B show the state of paired and joined optical sheet members that have undulations extended in substantially the same direction on the surfaces thereof, and that are employed in the embodiment;

FIG. 21A, FIG. 21B, FIG. 21C, and FIG. 21D show the states of paired and joined optical sheet members that have undulations extended in substantially symmetrical directions, on the surfaces thereof and that are employed in the embodiment;

DETAILED DESCRIPTION OF THE PREFERRED EMBODIMENTS

Figure 1:
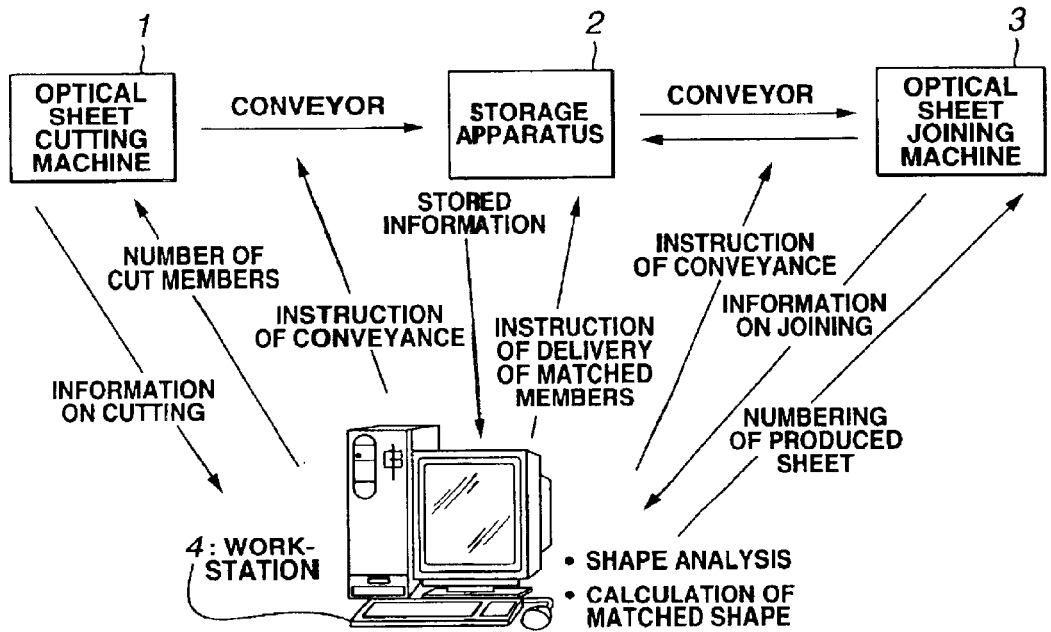
FIG. 1 is a block diagram showing the configuration of an optical sheet manufacturing system in accordance with an embodiment of the present invention.

Referring to the drawings, various embodiments of the present invention will be described below.

Figure 2:
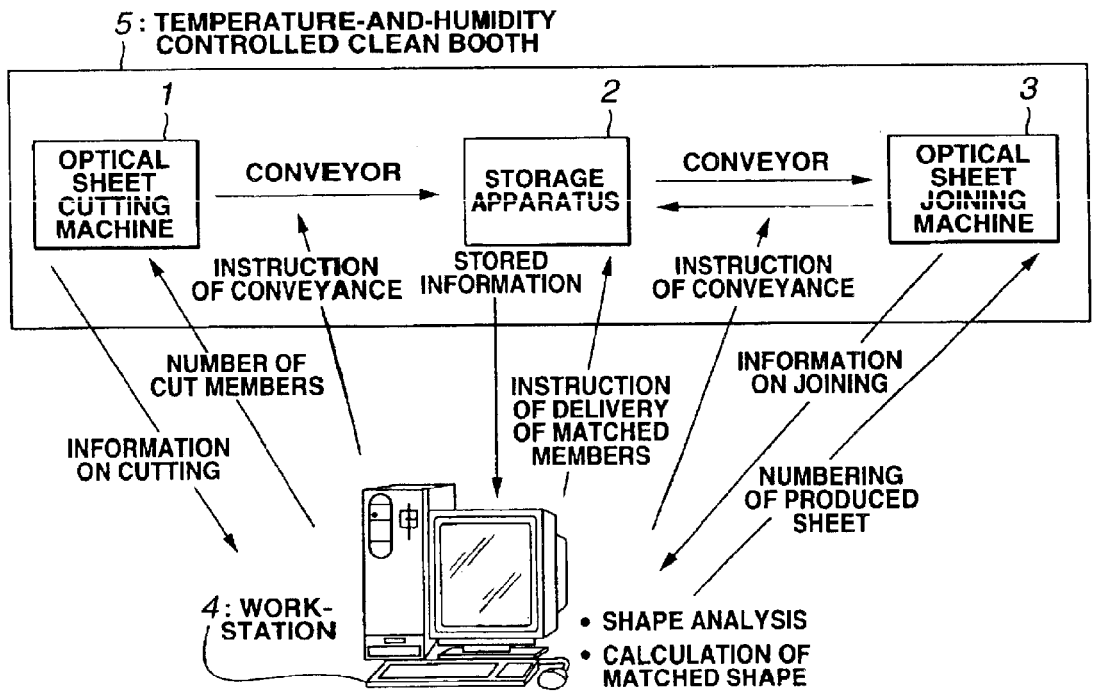
FIG. 2 is a block diagram showing the configuration of the optical sheet manufacturing system in accordance with the embodiment installed in a temperature-and-humidity controlled clean booth.

FIG. 1 to FIG. 22G show an embodiment of the present invention. FIG. 1 to FIG. 3 are concerned with an optical sheet manufacturing system. FIG. 4A to FIG. 10 are concerned with an optical sheet cutting machine. FIG. 11A to FIG. 17B are concerned with an optical sheet joining machine. FIG. 18A to FIG. 22G are concerned with an optical sheet.

To begin with, referring to FIG. 1 to FIG. 3, the overall configuration of an optical sheet manufacturing system and the actions thereof will be described below. FIG. 1 is a block diagram showing the configuration of the optical sheet manufacturing system. FIG. 2 is a block diagram showing the configuration of the optical sheet manufacturing system installed in a temperature-and-humidity controlled clean booth. FIG. 3 is a flowchart describing the actions of the optical sheet manufacturing system.

The optical sheet manufacturing system consists mainly of, as shown in FIG. 1, an optical sheet cutting machine 1, a reservoir 2, an optical sheet joining machine 3, and a workstation 4. The optical sheet cutting machine 1 trims an optical sheet member 6 that is produced by rolling a transparent resin material using a roller member (see FIG. 4A and FIG. 4B). At this time, the optical sheet cutting machine 1 trims the optical sheet member optimally for joining performed at a succeeding step. The optical sheet member 6 cut by the optical sheet cutting machine 1 is stored in the reservoir 2 and an optical sheet produced by the optical sheet joining machine 3 as mentioned later is also stored in the reservoir 2. The optical sheet joining machine 3 joins a plurality of optical sheet members 6, which is conveyed from the reservoir 2, so as to produce a large-area optical sheet. The workstation 4 serves as a controller for controlling these units. The optical sheet member 6 or optical sheet is conveyed between the optical sheet cutting machine 1 and the reservoir 2 or between the reservoir 2 and the optical sheet joining machine 3 by means of a conveyor that is a conveying machine.

FIG. 2 shows the configuration of the optical sheet manufacturing system. Herein, paths along which the optical sheet member 6 or optical sheet is distributed are enclosed in a temperature-and-humidity controlled clean booth 5. That is, the optical sheet cutting machine 1, reservoir 2, optical sheet joining machine 3, and the paths of the conveyors are installed in the temperature-and-humidity controlled clean booth 5. The temperature-and-humidity controlled clean booth 5 provides an environment-controlled zone in which predetermined temperature and humidity are maintained and the number of dust particles per unit volume in the air is kept equal to or less than a predetermined value.

The optical sheet member 6 employed in the optical sheet manufacturing system is produced as a thin sheet made of, for example, an acrylic material and may stretch or contract depending on temperature or humidity. Furthermore, since the optical sheet member is readily electrified, dust in the air is likely to adhere to the optical sheet member. Therefore, the optical sheet cutting machine 1, reservoir 2, optical sheet joining machine 3, and conveyors are installed in the temperature-and-humidity controlled clean booth 5 in order to prevent stretch or contraction, or adhesion of dust or the like. Consequently, the optical sheet member 6 can be manufactured highly precisely and maintained to offer high optical performance.

Next, referring to FIG. 3, a description will be made of an operation flow for manufacturing an optical sheet using the optical sheet manufacturing system.

When a production line starts operating, the workstation 4 obtains information from the optical sheet Cutting machine 1, reservoir 2, optical sheet joining machine 3, and conveyors (step S1). The workstation 4 instructs the optical sheet cutting machine 1 to start cutting (step S2).

A standby state is retained until the optical sheet cutting machine 1 transmits a message saying that cutting is completed (step S3). When the completion is confirmed, information on the cut optical sheet member 6 is obtained (step S4).

When the optical sheet member 6 is realized with a lenticular lens sheet, the information to be obtained at this time is information indicating whether the optical sheet member is cut by matching the edge of one elevation with the edge of other elevation or the edge of one depression with the edge of other depression. Otherwise, when undulations are observed over the surface of the lenticular lens sheet, the information to be obtained is information indicating the magnitude or direction of the undulations.

A serial number is assigned to the cut optical sheet member 6 (step S5). The obtained information is then stored in storage means incorporated in the workstation 4 in association with the serial number.

Thereafter, the conveyor is instructed to convey the optical sheet member 6 to the reservoir 2 (step S6). Information concerning a position at which the optical sheet member is stored is then obtained (step S7).

When a plurality of cut optical sheet members 6 are stored in the reservoir 2, the workstation 4 analyzes the shapes of the optical sheet members 6 according to the information stored in association with the serial numbers assigned to the optical sheet members 6 (step S8). A pair of optical sheet members 6 that is a best-matched pair in terms of joining is determined (step S9). At this time, when the optical sheet members are realized with lenticular lens sheets, optical sheet members each of which is cut with both edges of a cut surface formed with an elevation or a depression are selected as a pair to be joined. An optical sheet member cut with both edges of a cut surface thereof formed with an elevation will not be paired with an optical sheet member cut with both edges of a cut surface thereof formed with a depression. Furthermore, undulations on the surface of a lenticular lens sheet are taken account in selecting a best-matched pair.

It is then instructed that the optical sheet members 6 of the determined pair should be carried out of the reservoir 2 (step S10). The conveyor is then instructed to convey the carried-out optical sheet members 6 to the optical sheet joining machine 3 (step S11). The optical sheet joining machine 3 is then instructed to start joining (step S12).

Thereafter, a standby state is retained until the optical sheet joining machine 3 transmits a message saying that joining is completed (step S13). When the completion is confirmed, information concerning the produced optical sheet is obtained (step S14). A serial number is assigned to the optical sheet (step S15). The information obtained at step S14 is stored in association with the serial number.

The conveyor is instructed to convey the produced optical sheet (step S16). After the optical sheet is stored in the reservoir 2, information such as a position in the reservoir 2 at which the optical sheet is stored is obtained from the reservoir 2 and stored in the memory (step S17). The operation flow is then terminated.

Figure 4A:
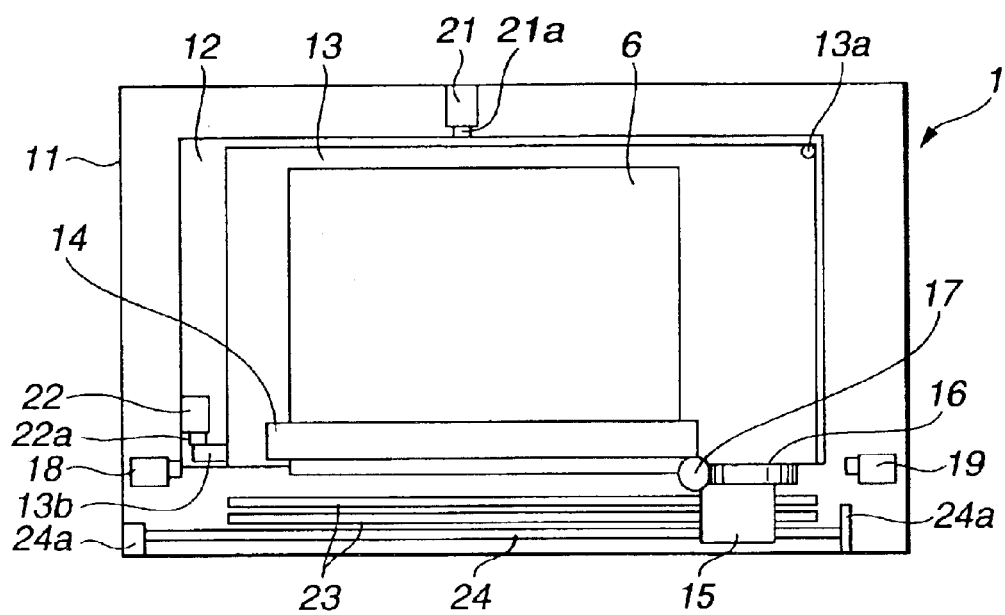
FIG. 4A is a plan view showing the structure of an optical sheet cutting machine included in the embodiment.
Figure 4B:
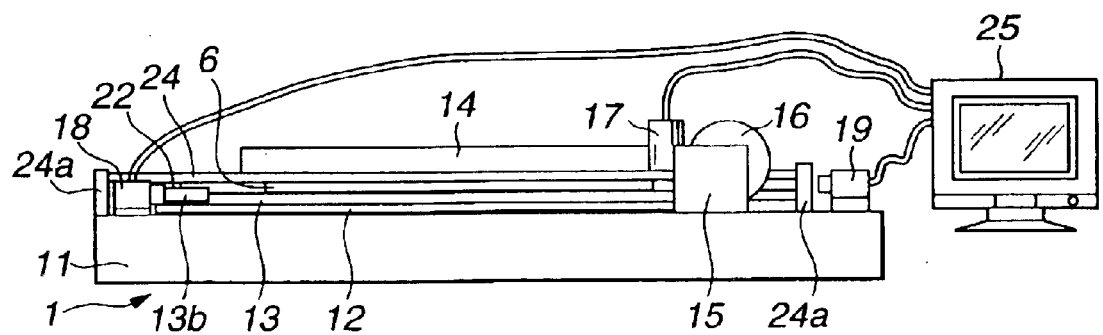
FIG. 4B is a front view showing the structure of the optical sheet cutting machine included in the embodiment.
Figure 5:
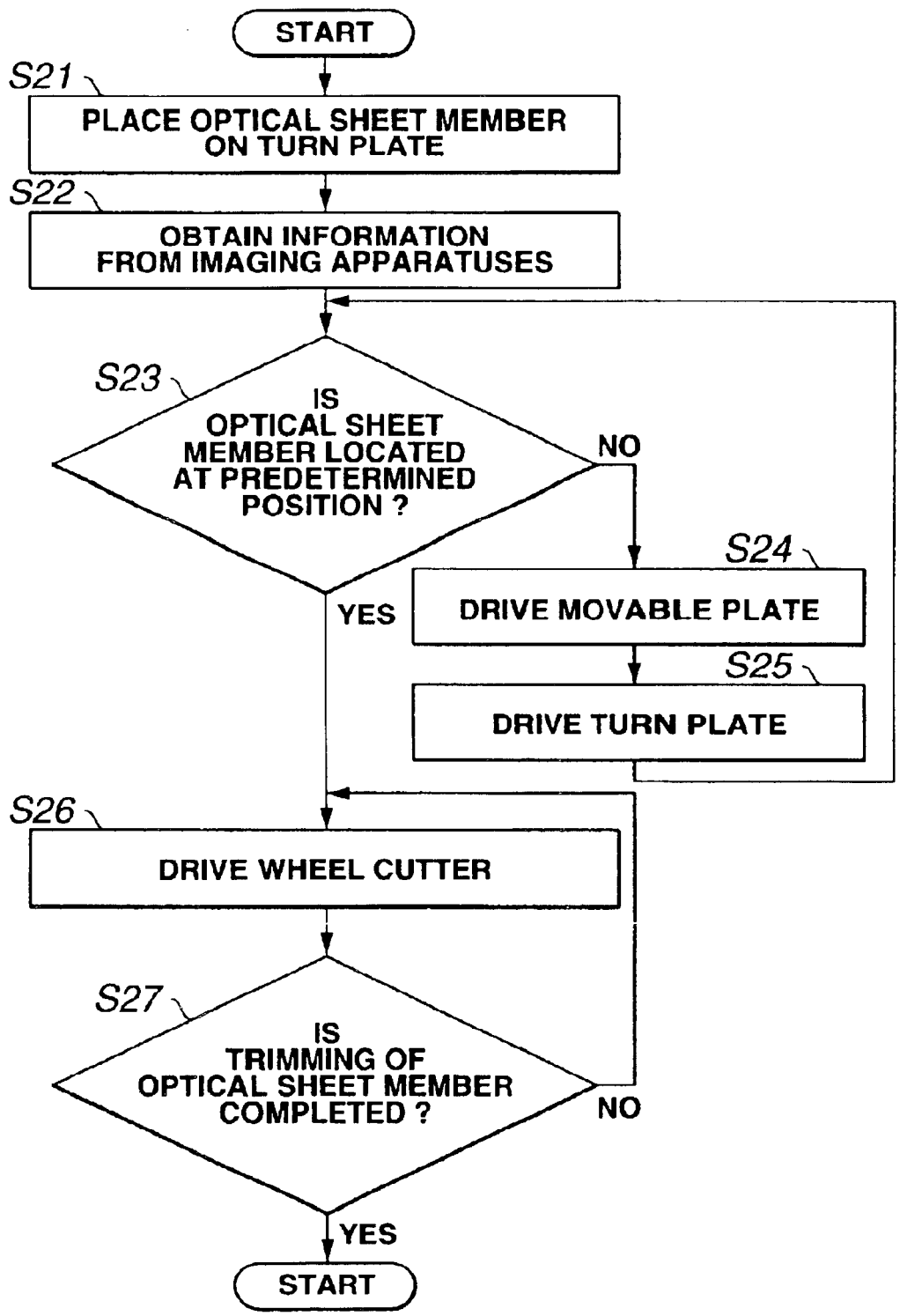
FIG. 5 is a flowchart describing the actions of the optical sheet cutting machine included in the embodiment.
Figure 6:
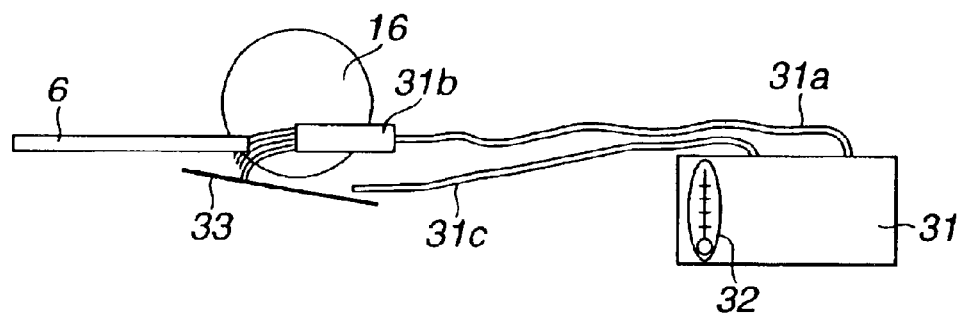
FIG. 6 shows the structure of a coolant feeder employed in the optical sheet cutting machine included in the embodiment.
Figure 7:
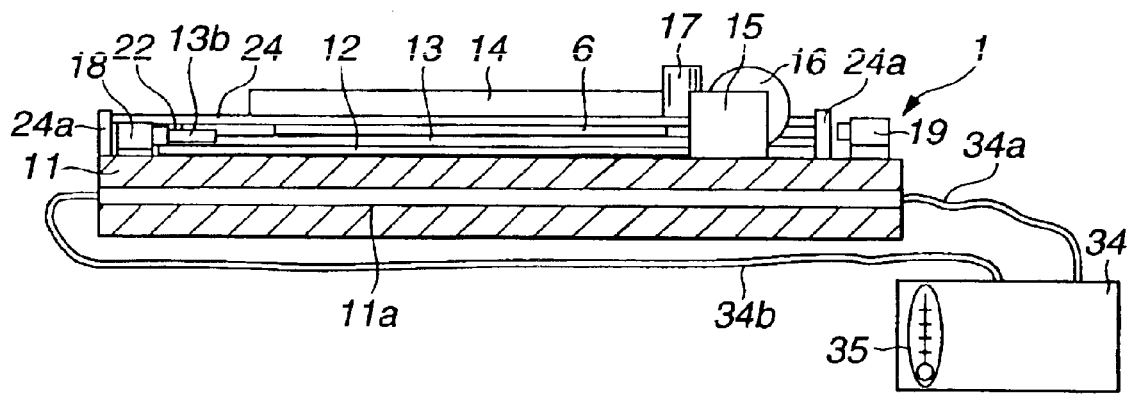
FIG. 7 is a front view, part of which is a sectional view, showing the structure of a base temperature adjuster that retains the temperature of a platform employed in the optical sheet cutting machine included in the embodiment at a predetermined position.
Figure 8:
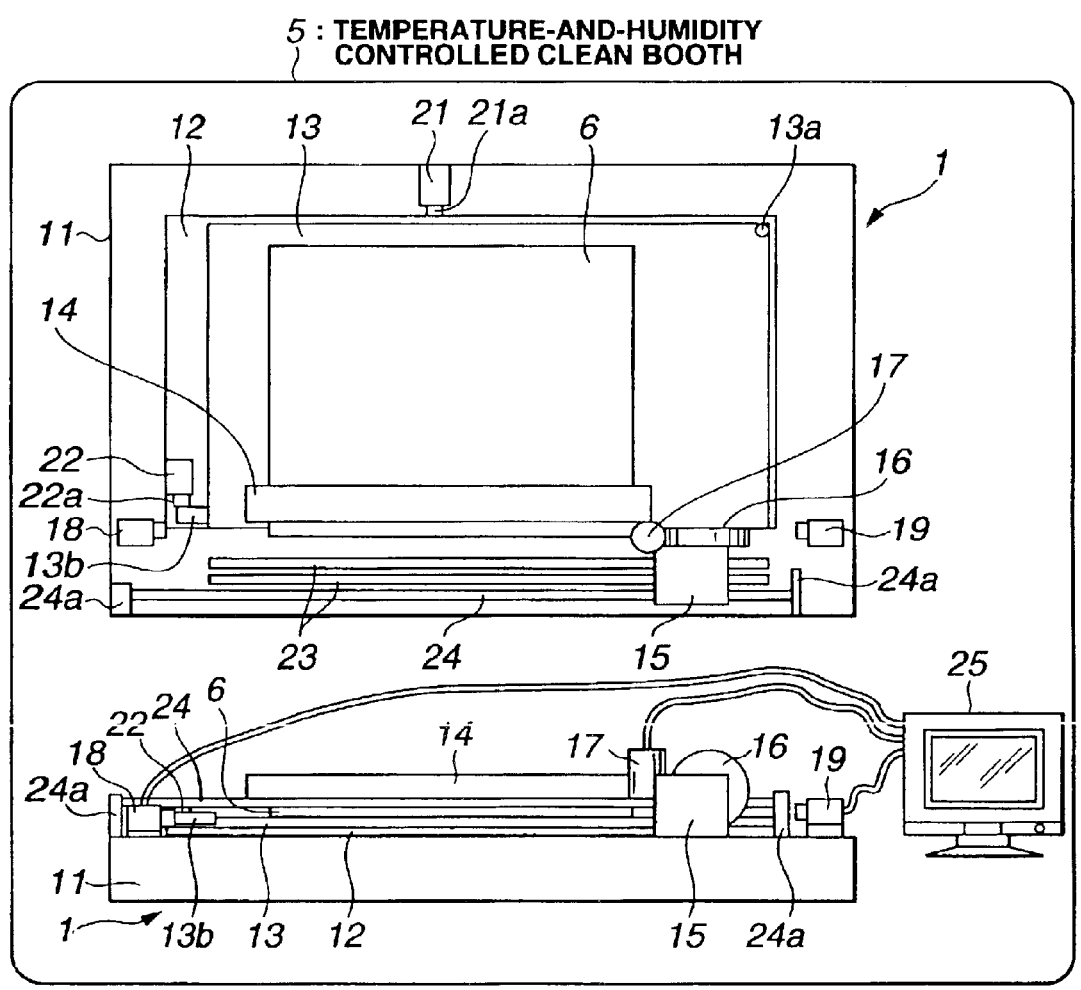
FIG. 8 shows the structure of the optical sheet cutting machine included in the embodiment and installed in a temperature-and-humidity controlled clean booth.
Figure 9:
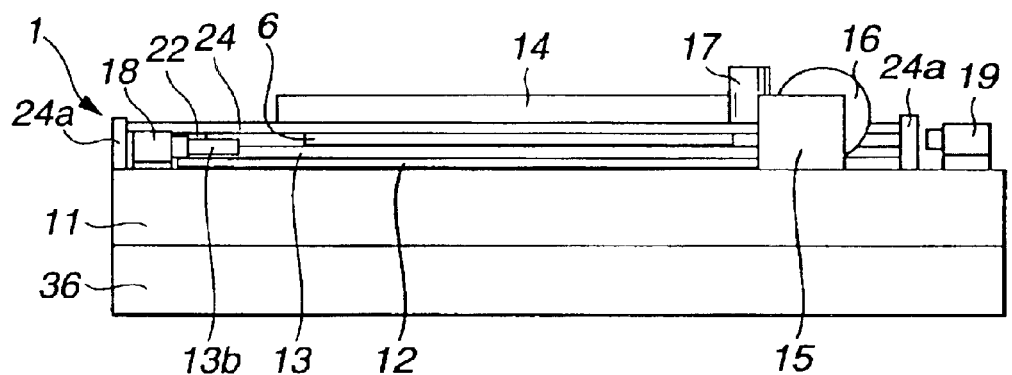
FIG. 9 is a front view showing an example of an anti-vibration structure for a platform employed in the optical sheet cutting machine included in the embodiment.
Figure 10:
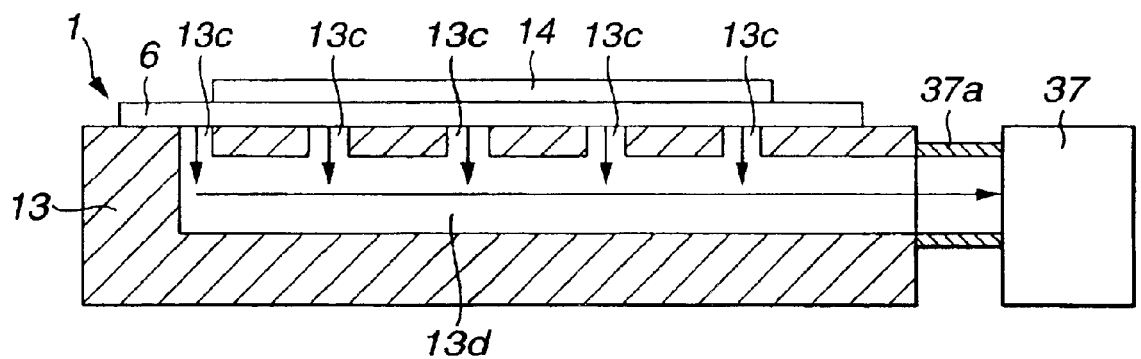
FIG. 10 is a sectional view showing a structure for the optical sheet cutting machine included in the embodiment which has a suction fixing device incorporated in a turn plate.

Next, referring to FIG. 4A to FIG. 10, the optical sheet cutting machine will be detailed. FIG. 4A is a plan view showing the structure of the optical sheet cutting machine. FIG. 4B is a front view showing the structure of the optical sheet cutting machine. FIG. 5 is a flowchart describing the actions of the optical sheet cutting machine. FIG. 6 shows the structure of a coolant feeder included in the optical sheet cutting machine. FIG. 7 is a front view part of which is a sectional view and which shows the structure of a base temperature adjuster. The base temperature adjuster helps retain the temperature of a platform included in the optical sheet cutting machine at predetermined temperature. FIG. 8 shows the optical sheet cutting machine installed in a temperature-and-humidity controlled clean booth. FIG. 9 is a front view showing an example of an anti-vibration structure for the platform employed in the optical sheet cutting machine. FIG. 10 is a sectional view showing a structure for the optical sheet cutting machine that has a suction fixing device incorporated in a turn plate.

To begin with, the optical sheet member 6 to be cut by the optical sheet cutting machine 1 is produced by pressing a transparent resin material, which is heated and softened, using a roller member that has a lenticular lens female mold inscribed on the periphery thereof. The state of the edges of the optical sheet member is often not optimal for joining. The optical sheet cutting machine 1 is therefore used to trim the optical sheet member 6 so that the optical sheet member 6 will have a joint surface optimal for joining to be performed at a subsequent step.

The optical sheet cutting machine 1 has a platform on which the optical sheet member 6 to be cut is placed. The platform consists mainly of a base 11, a movable plate 12 mounted on the base, and a turn plate 13 that is mounted on the movable plate 12 and on which the optical sheet member 6 is placed.

The movable plate 12 is guided by a rail member or the like that is not shown, and thus slid in the longitudinal direction of the optical sheet cutting machine 1 in FIG. 4A. The movable plate 12 is driven by slide driving means 21.

The slide driving means 21 includes a presser 21a capable of freely jutting out or sinking. The presser 21a is attached to the center of the upper edge of the movable plate 12 that is constrained to move upward in FIG. 4A. A position at which the presser 21a juts out or sinks is changed in order to adjust a slide position.

The turn plate 13 can pivot on a turn pin 13a which supports the turn plate 13 so that the turn plate can pivot freely and which is fixed to the movable plate 12. The turn plate 13 is driven to pivot by means of a turn driving means 22.

The turn driving means 22 has a presser 22a capable of freely jutting out or sinking. The presser 22a is engaged with an engagement arm 13b that is projected from the corner of the turn plate 13, opposite angle to the turn pin 13a. The turn plate 13 is constrained to pivot clockwise in FIG. 4A on the turn pin 13a. A position at which the presser 22a juts out or sinks is changed in order to adjust a turn position.

After the optical sheet member 6 is placed on the turn plate 13, the optical sheet member 6 is pressed by, for example, a locking member 14 that is a sheet pressure. The optical sheet member 6 is thus locked on the turn plate 13.

The base 11 has, for example, two rail members 23 that extend in a direction of cutting. A slide unit 15 having a wheel cutter 16 that is a cutting blade used to trim the optical sheet member 6 is guided along the rail, members 23 in a direction of thrusting.

A rotation motor serving as a cutting drive source that is not shown and a feed motor serving as a feed driving source are incorporated in the slide unit 15. The rotation motor has the wheel cutter 16.

The wheel cutter 16 has the surface thereof finished with a grinder particulate made of diamond or cubic boron nitride (CBN). The grinder particulate made of diamond or CBN is superior to any other general grinder particulate in terms of hardness and strength. The wheel cutter 16 is rotated by the rotation motor, which is a cutting drive source, at a rotating speed ranging, for example, from 3000 rpm to 30000 rpm. Consequently, the wheel cutter 16 can produce a cut surface of small roughness, optimal for joining, for example, the roughness of Rmax 0.8 S or less.

Moreover, the feed motor causes the slide unit 15 itself to move along the rail members 23. Specifically, a gear rotated by the feed motor is meshed with a feed shaft 24 whose both ends are fixed to fixtures 24a secured to the base 11, and thus moved along the rail members 23.

The positional relationship information between the wheel cutter 16 included in the slide unit 15 and the optical sheet member 6 is image-picked up and obtained using a top observation camera 17 and section observation cameras 18 and 19. These cameras 17, 18 and 19 are investigating devices. Specifically, the top observation camera 17 that is a top image-pickup apparatus is mounted on the slide unit 15 and moved together with the slide unit. The section observation cameras 18 and 19 that are section image-pickup apparatuses are mounted on the base 11 at proximal and distal positions in a direction in which the wheel cutter 16 is advanced.

Images picked up by the cameras 17, 18, and 19 are, as shown in FIG. 4B, transferred to a monitor 25 and viewed by an operator. Moreover, the images picked up by the cameras 17, 18, and 19 are processed in order to allow the operator to grasp the shape of the surface of the optical sheet member 6. Thereafter, the resultant image data is transmitted to the workstation 4 and may be used for analysis of the shape of the surface.

Next, referring to FIG. 5, the actions of the optical sheet cutting machine 1 will be described below.

When an operation flow is started, the optical sheet member 6 is placed on the turn plate 13 (step S21). An operator may perform this action. For advanced automation, the conveyor or the like should be used to automatically place the optical sheet member on the turn plate. In this case, the workstation 4 gives an instruction and controls a series of associated actions.

Thereafter, images picked up by the top observation camera 17 and section observation cameras 18 and 19 are displayed on the monitor 25 or transmitted to the workstation 4. Information is thus obtained (step S22). In order to grasp the shape condition of the surface of the optical sheet member 6, the optical sheet cutting machine 1 itself may perform image processing or the like or the workstation 4 may perform it.

It is judged from the obtained image information whether the optical sheet member 6 is located at a predetermined position optimal for cutting (step S23). When the optical sheet member 6 is realized with a lenticular lens sheet, the predetermined position is a position at which the ends of the same elevation that is a convex part of the lenticular lens sheet or the same depression that is a concave part thereof lie at the proximal and distal points on a cutting band line.

If it is judged at step S23 that the optical sheet member 6 is not located at the predetermined position, the slide driving means 21 causes the movable plate 12 to slide (step S24). The turn driving means 22 causes the turn plate 13 to pivot (step S25). Thus, the optical sheet member 6 has the position thereof adjusted to lie at the predetermined position.

When the optical sheet member 6 is located at the predetermined position, the rotation motor is driven in border to rotate the wheel cutter 16. The feed motor is driven in order to move the slide unit 15, which is engaged with the feed shaft 24, along the rail members 23 (step S26).

A standby state is then attained and retained until the optical sheet member 6 is cut up to the distal point on the cutting band line (step S27). When it is confirmed that the cutting is completed, the optical sheet cutting machine 1 is deactivated.

When the wheel cutter 16 is rotated in order to trim the optical sheet member 6, heat is generated due to friction occurring during rotation. The optical sheet member 6 is, as mentioned above, made of, for example, an acrylic. When heat is generated, the optical sheet member 6 may be stretched or contracted, or softened. This hinders accurate cutting. Consequently, the coolant feeder 31 shown in FIG. 6 is used to cool the wheel cutter 16 and a cut region of the optical sheet member 6.

A coolant feed pipe 31a is coupled to the coolant feeder 31, and a discharge port member 31b is fixed to the distal end of the coolant feed pipe 31a. A coolant fed through the discharge port member 31b by means of the coolant feeder 31 is dispersed to the wheel cutter 16 and optical sheet member 6 alike. The wheel cutter 16 and optical sheet member 6 are thus cooled.

The coolant dispersed and used for cooling flows down a slope 33. The coolant is then collected along a collection pipe 31c and returned to the coolant feeder 31 for reuse.

As mentioned above, the optical sheet member 6 stretches or contracts depending on temperature. Therefore, the temperature of the coolant should be neither too high nor too low. A coolant temperature adjusting device 32 is incorporated in the coolant feeder 31 in order to retain the temperature of a coolant at predetermined temperature.

The coolant is used to cool generated heat and also proved effective in smoothing a cut surface of the optical sheet member 6 produced by the wheel cutter 16.

Referring to FIG. 7, a structure for keeping the temperature of the base 11 constant will be described below.

As mentioned above, unless the optical sheet member 6 is held at certain temperature, it stretches or contracts. The temperature of the platform on which the optical sheet member 6 is placed should therefore be kept constant.

A medium for adjusting temperature is therefore circulated through, for example, the base 11 included in the platform. The temperature of the platform is thus kept constant.

Specifically, a base temperature adjuster 34 feeds a medium by way of a medium feed pipe 34a, passes the medium through a medium distribution channel 11a formed in the base 11, and collects the medium through a medium collection pipe 34b.

A medium temperature adjusting device 35 analogous to the coolant temperature adjusting device 32 is incorporated in the base temperature adjuster 34 in order to retain the temperature of the medium at predetermined temperature.

Since the temperature of the base 11 is thus kept constant, the temperature of the turn plate 13 with which the optical sheet member 6 comes into direct contact is kept constant. Therefore, the optical sheet member 6 will neither stretch nor contract and can be positioned accurately and cut precisely.

FIG. 8 shows the entire optical sheet cutting machine 1 installed in the aforesaid temperature-and-humidity controlled clean booth 5. The optical sheet cutting machine 1 may be installed solely or may, as shown in FIG. 2, be installed together with the other equipment.

Consequently, total temperature control can be achieved on a more stable basis. Moreover, adhesion of dust in the air to the optical sheet member 6 can be prevented effectively.

FIG. 9 shows an example of an anti-vibration structure for the optical sheet cutting machine 1. In this example, an anti-vibration pedestal 36 formed with a rubber or springs is used to bottom the base 11.

Using the structure, even if a highway on which, for example, large trucks run exists in the vicinity of a manufacturing works, the optical sheet member 6 can be cut accurately while being unaffected by vibrations stemming from the running trucks.

FIG. 10 shows a structure for the optical sheet cutting machine 1 that has a suction fixing device incorporated in the turn plate 13.

The optical sheet member 6 is locked on the turn plate 13 using the locking member 14. More preferably, the optical sheet member 6 should be brought into close contact with the turn plate 13 with sufficient flatness ensured.

Therefore, a plurality of suction holes 13c are, as shown in FIG. 10, bored in the surface of the turn plate 13 on which the optical sheet member 6 is placed. A vent 13d with which the suction holes 13 communicate is formed internally. A suction pump 37 is used to suck air through a pipe 37a.

Owing to the structure, cutting can be achieved more accurately.

Figure 12A:
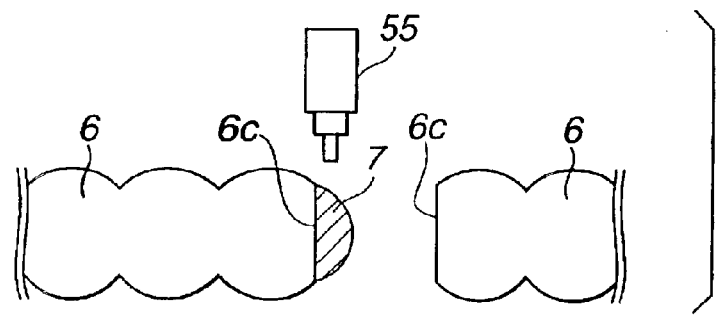
FIG. 12A, FIG. 12B, FIG. 12C, FIG. 12D, and FIG. 12E are side views showing an operation flow according to which the optical sheet joining machine included in the embodiment joins optical sheet members.
Figure 12B:
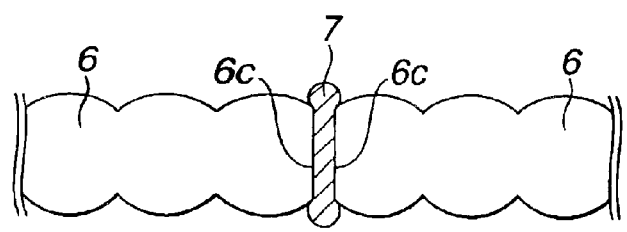
Figure 12C:
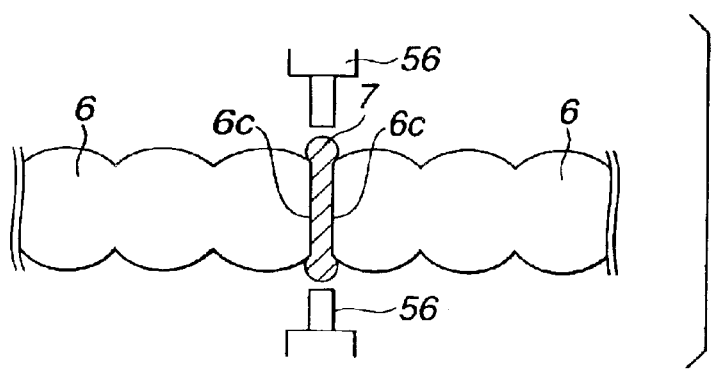
Figure 12D:
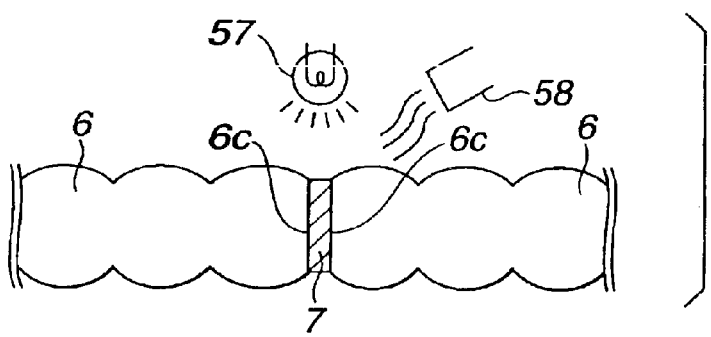
Figure 12E:
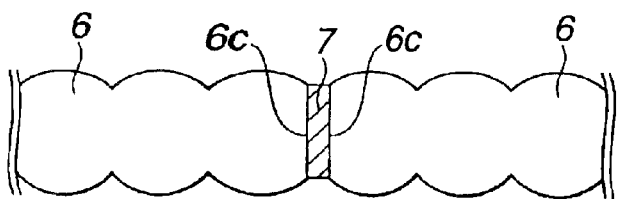
Figure 13:
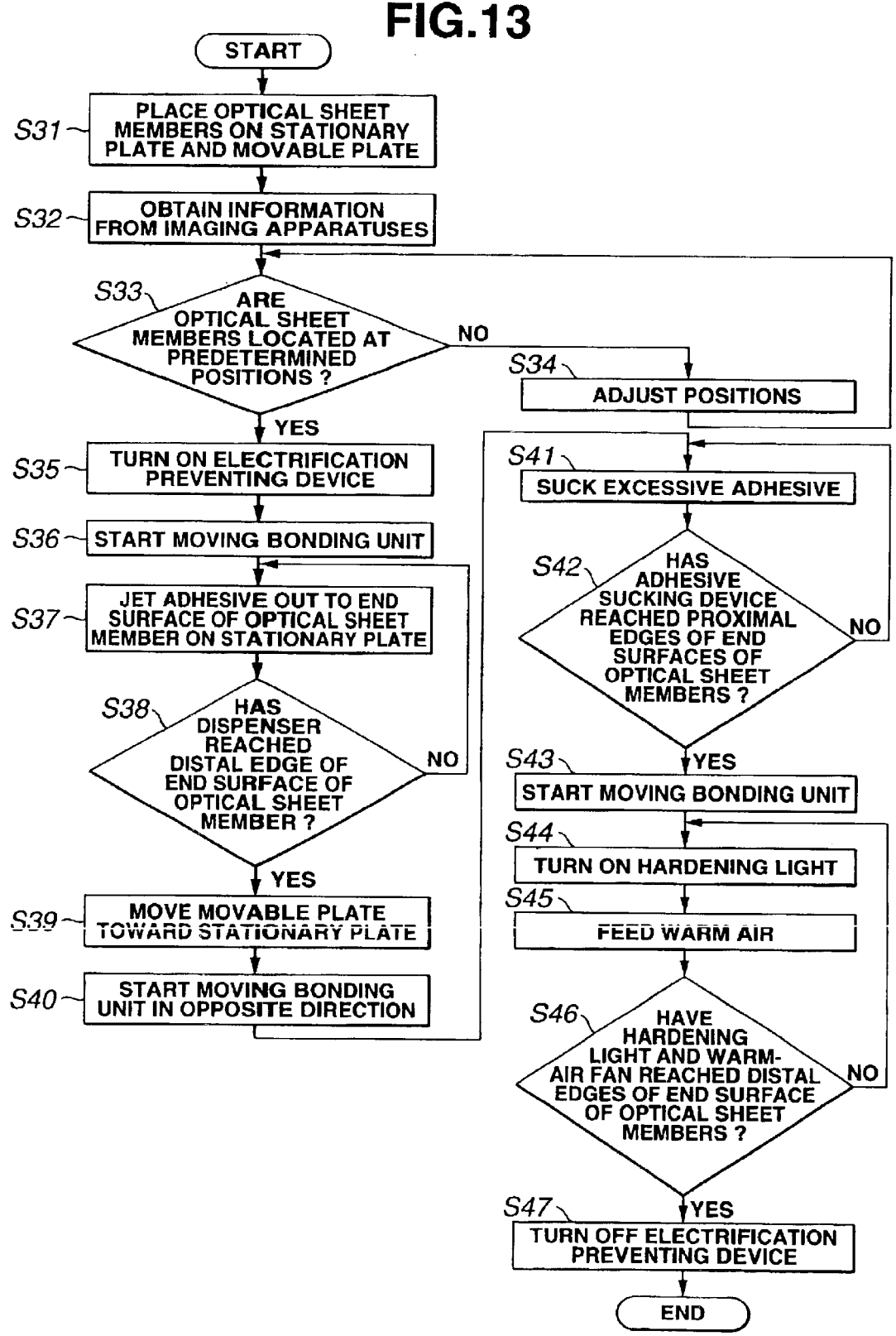
FIG. 13 is a flowchart describing the actions of the optical sheet joining machine included in the embodiment.
Figure 14:
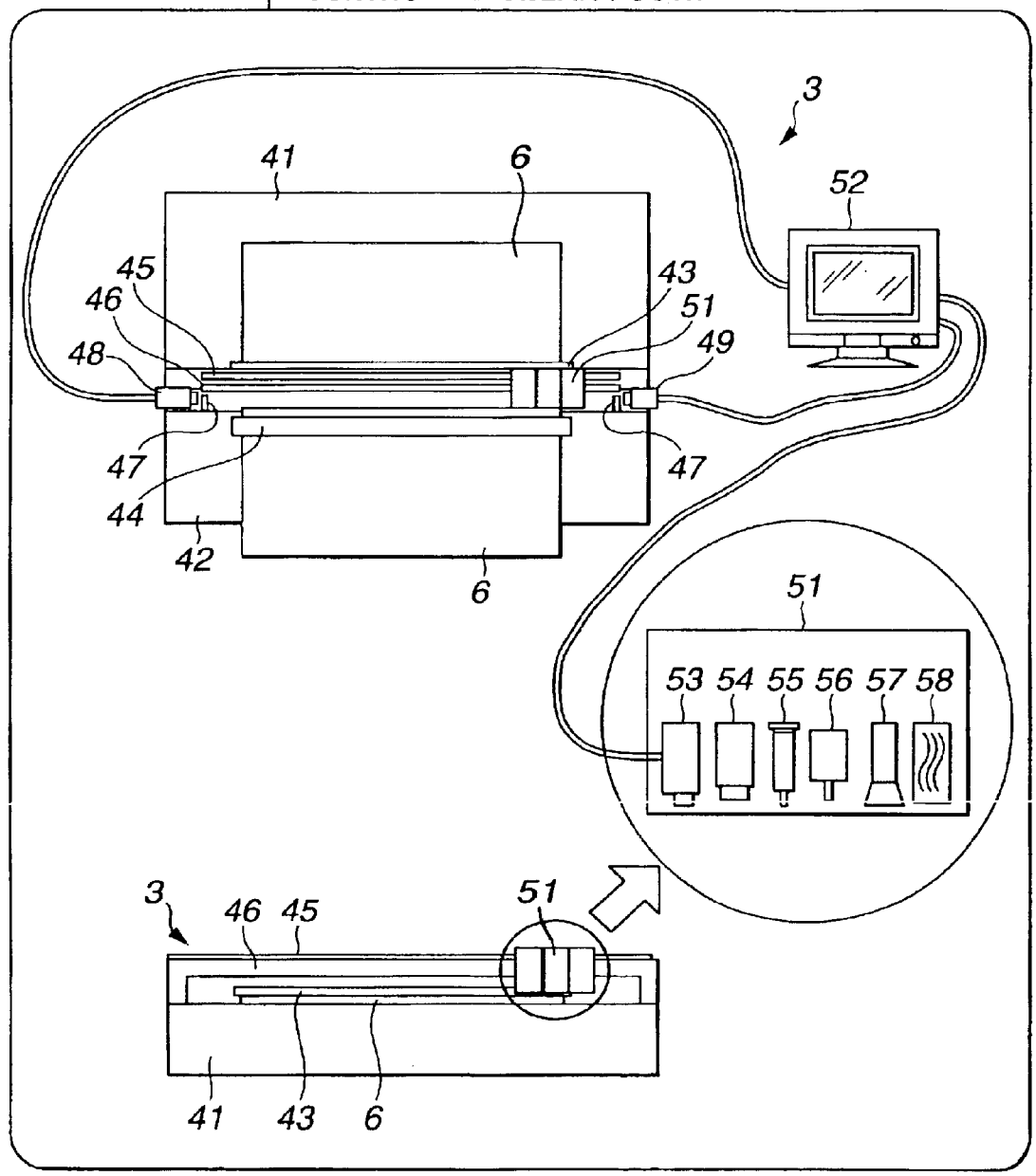
FIG. 14 shows the structure of the optical sheet joining machine included in the embodiment and installed in the temperature-and-humidity controlled clean booth.
Figure 15:
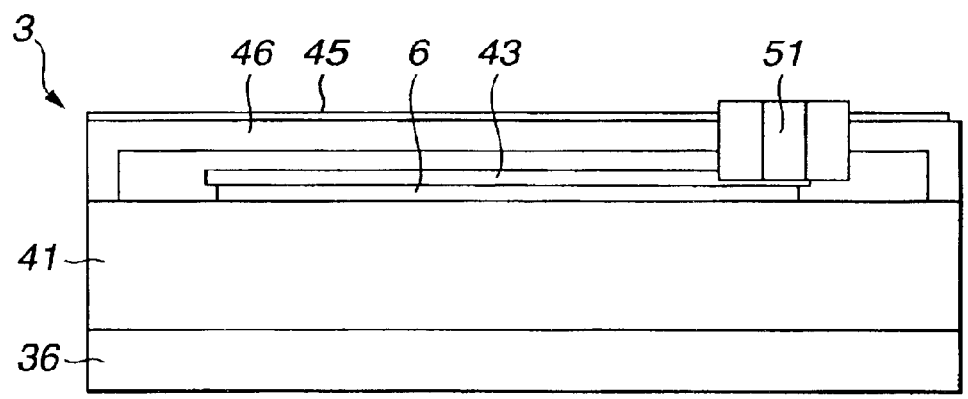
FIG. 15 is a front view showing an example of an anti-vibration structure for the optical sheet joining machine included in the embodiment.
Figure 16:
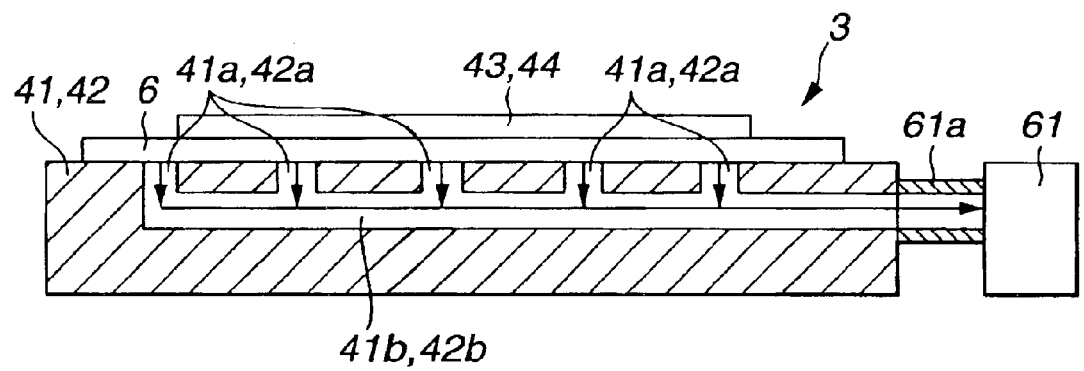
FIG. 16 is a sectional view of a structure for the optical sheet joining machine included in the embodiment which has a suction fixing device incorporated in at least one of a stationary plate and a movable plate.
Figure 17A:
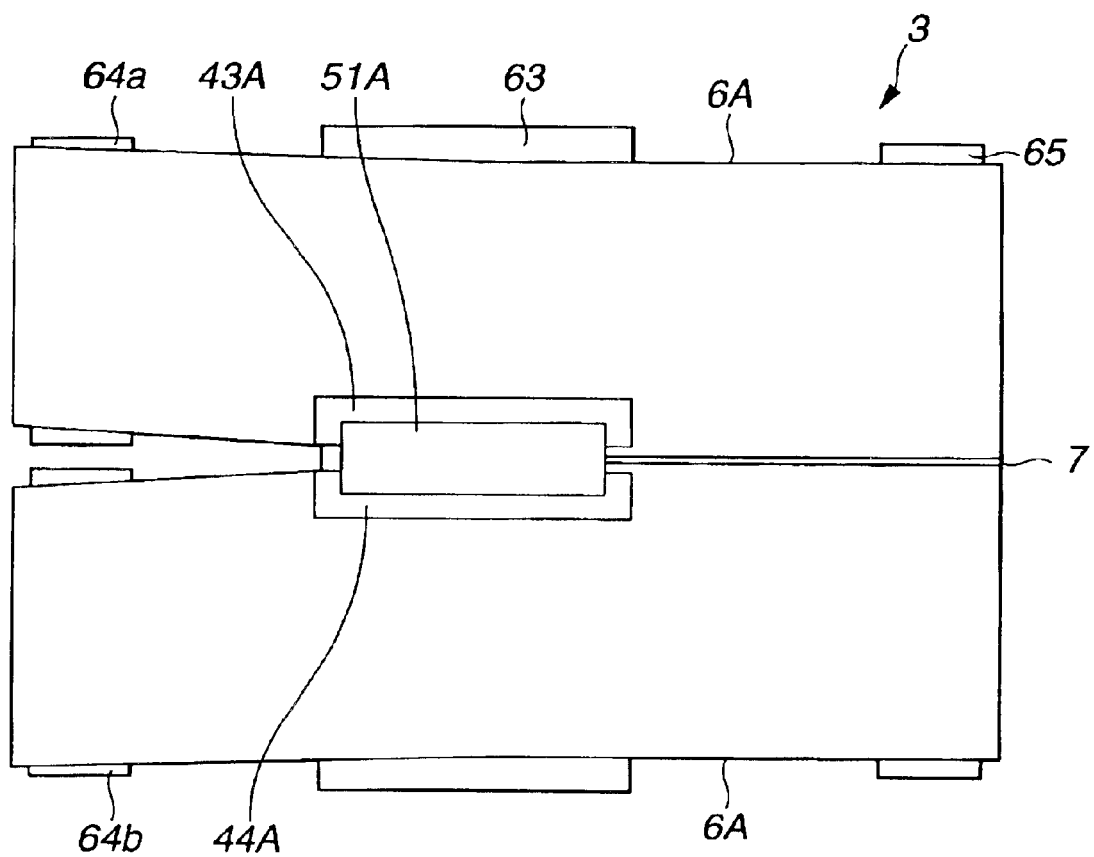
FIG. 17A is a plan view showing an example of a structure for the optical sheet joining machine included in the embodiment which enables sequential joining of elongated optical sheet members.
Figure 17B:
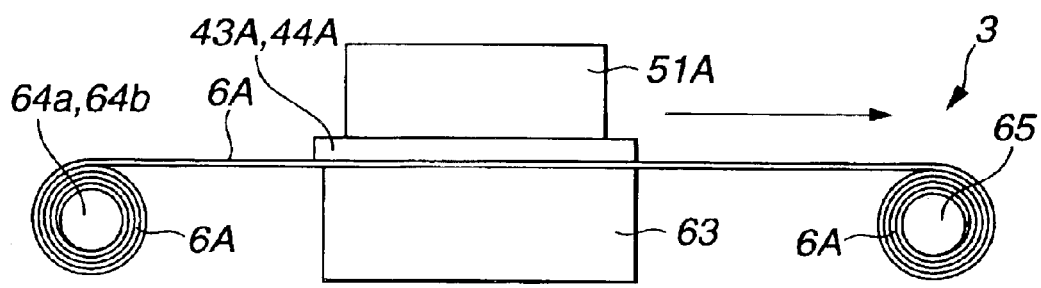
FIG. 17B is a front view showing the example of the structure for the optical sheet joining machine included in the embodiment which enables sequential joining of elongated optical sheet members.

Referring to FIG. 11A to FIG. 17B, the structure of the optical sheet joining machine will be detailed below. FIG. 11A is a plan view showing the structure of the optical sheet joining machine. FIG. 11B is a front view showing the structure of the optical sheet joining machine. FIG. 11C is an enlarged view showing part of the structure of the optical sheet joining machine. FIG. 12A, FIG. 12B, FIG. 12C, FIG. 12D, and FIG. 12E are side views showing a flow operation in which the optical sheet joining machine joins optical sheet members. FIG. 13 is a flowchart describing the actions of the optical sheet joining machine. FIG. 14 shows the optical sheet joining machine installed in the temperature-and-humidity controlled clean booth. FIG. 15 is a front view showing an example of an anti-vibration structure for the optical sheet joining machine. FIG. 16 is a sectional view showing a structure for the optical sheet joining machine that has a suction fixing device incorporated in at least one of a stationary plate and a movable plate. FIG. 17A is a plan view showing an example of a structure for the optical sheet joining machine that enables sequential joining of elongated optical sheet members. FIG. 17B is a front view showing the example of the structure for the optical sheet joining machine that enables sequential joining of elongated optical sheet members.

The optical sheet members 6 cut by the aforesaid optical sheet cutting machine 1 are joined by the optical sheet joining machine 3.

Specifically, the optical sheet joining machine 3 consists mainly of a stationary plate 41, a locking member 43, a movable plate 42, a locking member 44, and a bonding unit 51. One optical sheet member 6 is placed on the stationary plate 41. The locking member 43 is realized with a sheet presser or the like and locks the placed optical sheet member 6 on the stationary plate 41. The other optical sheet member 6 is placed on the movable plate 42. The locking member 44 is realized with a sheet presser or the like and locks the placed optical sheet member 6 on the movable plate 42. The bonding unit 51 applies an adhesive 7 to an end surface 6c of one optical sheet member 6, which is a joint surface, from the proximal edge to the distal edge (see FIG. 12A, FIG. 12B, FIG. 12C, FIG. 12D, and FIG. 12E) so that the optical sheet member 6 can be bonded to the other optical sheet member 6.

The movable plate 42 is guided by a guide member 47 and thus movable to approach or recede from the stationary plate 41.

The stationary plate 41 has a rail member 45. The bonding unit 51 can move along the rail member 45. A moving mechanism for moving the bonding unit 51 is such that a gear rotated by a feed motor incorporated in the bonding unit 51 is meshed with a feed shaft 46, which has both end portions thereof fixed to the stationary plate 41, in order to move the bonding unit 51 along the rail member 45.

Furthermore, section observation cameras 48 and 49 used to observe joint surfaces are located at the proximal and distal positions in a direction, in which the bonding unit 51 advances, on the stationary plate 41.

Moreover, the bonding unit 51 consists mainly of a top observation camera 53, an electrification preventing device 54, a dispenser 55, an adhesive sucking device 56, a hardening light 57, and a warm-air fan 58. The top observation camera 53 that is an imaging device is used to observe joining from above. The electrification preventing device 54 prevents electrification of two optical sheet members 6 to be joined. The dispenser 55 jets an adhesive 7 out to the end surface 6c of the optical sheet member 6 locked on the stationary plate 41. Herein, the end surface 6c may be referred to as a joint surface. The adhesive sucking device 56 sucks a portion of the adhesive 7 sandwiched between the two optical sheet members 6 which oozes out. The hardening light 57 is used to harden the adhesive 7. The warm-air fan 58 facilitates joining of the two optical sheet members 6.

Furthermore, images picked up by the cameras 48, 49, and 53 are transferred to a monitor 52 and viewed by an operator. Otherwise, the images picked up by the cameras 48, 49, and 53 are sent to the workstation 4 as information on joining.

Next, the actions of the optical sheet joining machine 3 will be described with reference to FIG. 12A, FIG. 12B, FIG. 12C, FIG. 12D, FIG. 12E, and FIG. 13.

When an operation flow is started, two optical sheet members 6 are placed on the stationary plate 41 and movable plate 42 respectively (step S31). As mentioned above, an operator may perform this action. For advanced automation, the conveyor or the like should be used to automatically place the optical sheet members. In this case, the workstation 4 gives an instruction and controls a series of associated actions.

Next, images picked up by the top observation camera 53 and the section observation cameras 48 and 49 are displayed on the monitor 52 or transmitted to the workstation 4. Information is thus obtained (step S32).

Based on the information, it is judged whether the optical sheet members 6 are located at predetermined positions optimal for joining on the stationary plate 41 and movable plate 42 respectively (step S33). If the optical sheet members 6 are not located at the predetermined positions, the positions of the optical sheet members are adjusted (step S34).

At this time, the end surface 6c of the optical sheet member 6 placed on the stationary plate 41 and the end surface 6c of the optical sheet member 6 placed on the movable plate 42 are separated from each other by a predetermined distance (see FIG. 12A). The end surface 6c may be referred to as a joint surface.

If it is judged at step S33 that the optical sheet members are located at the predetermined positions, the electrification preventing device 54 is turned on (step S35). Thus, dust in the air is prevented from adhering to the optical sheet members 6. The bonding unit 51 is then moved along the rail member 45 (step S36).

After the bonding unit 51 starts moving, when the dispenser 55 reaches the proximal edge of the end surface 6c or joint surface of the optical sheet member 6 placed on the stationary plate 41, the dispenser 55 starts, as shown in FIG. 12A, jetting out the adhesive 7 (step S37).

It is then judged whether the dispenser 55 has reached the terminal edge of the end surface 6c of the optical sheet member 6 along with the movement of the bonding unit 51 (step S38). The movement is continued at step S37 until the dispenser 55 reaches the terminal edge.

If it is confirmed at step S37 that the dispenser 55 has reached the terminal edge of the end surface 6c of the optical sheet member 6, the movable plate 42 is moved along the guide member 47 manually or using a driving mechanism that is not shown. Thus, the movable plate approaches the stationary plate 41 (step S39).

Consequently, one optical sheet member 6 and the other optical sheet member 6 approach each other. As shown in FIG. 12B, the adhesive 7 adhering to the end surface 6c of one optical sheet member 6 also adheres to the end surface 6c of the other optical sheet member 6. The adhesive 7 is thus sandwiched between the end surfaces 6c of the two optical sheet members 6.

At this time, preferably, the two optical sheet members 6 are approached at a constant speed so that joining can be performed uniformly and for fear bubbles may be mixed in the adhesive 7.

Thereafter, the feed motor incorporated in the bonding unit 51 is rotated reversely in order to move the bonding unit 52 in an opposite direction (step S40). The adhesive sucking device 56 sucks an excessive portion of the adhesive 7 oozing out from the joint surfaces of the optical sheet members 6 (step S41).

Oozing out of the adhesive 7 is thought to occur on both sides of the optical sheet members 6. Therefore, the excessive portion of the adhesive should be, as shown in FIG. 12C, sucked from both the sides of the optical sheet members using a plurality of adhesive sucking devices 56.

It is then judged whether the adhesive sucking device 56 has reached the proximal edges of the end surfaces 6c of the optical sheet members 6 (step S42). If not, the action of step S41 is continued until the adhesive sucking device reaches the proximal edges thereof.

If it is confirmed at step S42 that the adhesive sucking device has reached the proximal edges of the end surfaces 6c of the optical sheet members 6, the feed motor incorporated in the bonding unit 51 is rotated forward to move the bonding unit in a forward direction similarly to that at step S36 (step S43).

When the movement is started, the hardening light 57 is, as shown in FIG. 12D, turned on at the same time (step S44). Furthermore, the warm-air fan 58 is actuated in order to start feeding warm air (step S45). The adhesive 7 is thus hardened sequentially along the joint line defined with the joint surfaces.

Thereafter, it is judged whether the hardening light 57 and warm-air fan 58 have reached the terminal edges of the end surfaces 6c of the optical sheet members 6 (step S46). Otherwise, the actions of step S44 and step S45 are continued until the hardening light 57 and warm-air fan 58 reach the terminal edges.

If it is confirmed at step S46 that the hardening light 57 and warm-air fan 58 have reached the terminal edges of the end surfaces 6c of the optical sheet members 6, the plurality of optical sheet members 6 are, as shown in FIG. 12E, joined to produce a large-area optical sheet. The adhesive 7 is made of a transparent material whose optical property such as a refractive index is as close as possible to that of a material made into the optical sheet members 6. Therefore, the optical property of the optical sheet will not be impaired due to the join surfaces.

The electrification preventing device 54 turned on at step S35 is turned off, whereby the joining operation is terminated.

FIG. 14 shows the entire optical sheet joining machine 3 shown in FIG. 11A, FIG. 11B, and FIG. 11C and installed in the aforesaid temperature-and-humidity controlled clean booth 5. At this time, the optical sheet joining machine 3 may be installed solely or may be, as shown in FIG. 2, installed therein together with the other equipment.

Consequently, total temperature control can be achieved on a more stable basis. Moreover, adhesion of dust in the air to the optical sheet members 6 can be prevented effectively.

FIG. 15 shows an example of an anti-vibration structure for the optical sheet joining machine 3. In this example, an anti-vibration pedestal formed with a rubber or springs similarly to the aforesaid one is used to bottom the stationary plate 41. Consequently, the optical sheet members 6 can be joined accurately while being unaffected by vibrations.

FIG. 16 shows a structure for the optical sheet joining machine 3 that has a suction fixing device incorporated in each of the stationary plate 41 and movable plate 42.

Even at a joining step of a manufacturing process, similarly to at the aforesaid cutting step, the locking members 43 and 44 are used to lock the optical sheet members 6. For higher flatness, the suction fixing device should be used in addition.

Specifically, as shown in FIG. 16, pluralities of suction holes 41a and 42a are bored in the surfaces of the stationary plate 41 and movable plate 42 respectively on which the optical sheet members 6 are placed. Vents 41b and 42b with which the suction holes 41a and 42a communicate are formed internally. A suction pump 61 is then used to suck air through a pipe 61a. This enables more accurate joining.

Next, referring to FIG. 17A and FIG. 17B, a description will be made of an example of a structure for the optical sheet joining machine that enables sequential joining of elongated optical sheet members.

The optical sheet joining machine 3 sequentially joins optical sheet members 6A, each of which is shaped like a belt having a predetermined width, with the longitudinal edges of the optical sheet members met each other.

Specifically, the optical sheet members 6A that are not yet joined are, as shown in FIG. 17A and FIG. 17B, wound about take-up members 64a and 64b respectively. The optical sheet members 6A are pulled out onto a plate 63 at a predetermined speed, and joined while being moved. Thereafter, the optical sheet members 6A are taken up by a take-up member 65. At this time, when for example, the take-up member 65 is rotated using a driving mechanism such as a motor, an optical sheet moving mechanism is realized for moving the optical sheet members 6A to the plate 63 or to a bonding unit 51A that will be described later.

To be more specific, two optical sheet members 6A are placed on the plate 63 so that they can move along the longitudinal direction of the plate 63. Furthermore, the plate 63 is designed so that the two optical sheet members 6A separated from each other by a predetermined distance will approach each other in a direction on a moving path in which the optical sheet members advance.

The two optical sheet members 6A placed on the plate 63 are pressed by pressing members 43A and 44A respectively so that they can slide. This is intended to move the optical sheet members 6A with at least the portions thereof to be joined brought into close contact with the plate 63.

The bonding unit 51A is fixed to the plate 63 located near the pressing members 43A and 44A. The bonding unit 51A enables sequential joining of two optical sheet members 6A that move over the plate 63.

The portions of the optical sheet members 6A that are in the opposite direction to advancement direction (near the winding members 64a and 64b) are separated from each other by a predetermined distance. At this time, the dispenser 55 (see FIG. 11C) incorporated in the bonding unit 51A sequentially sprays the adhesive 7 to the end surface 6c or joint surface of one optical sheet member 6A. As the optical sheet members 6A advance, they approach rapidly. When the optical sheet members 6A come into close contact with each other with the adhesive 7 between them, the adhesive sucking device 56 sucks the excessive portion of the adhesive 7. Thereafter, the hardening light 57 and warm-air fan 58 are used to harden the adhesive.

The structures and abilities of the top observation camera 53 and electrification preventing device 54 incorporated in the bonding unit 51A are identical to those described in conjunction with FIG. 11C and others.

As mentioned above, the optical sheet members 6A are joined sequentially by performing an operation flow. The bonding unit 51A is therefore longer in the direction, in which the optical sheet members 6A advance, than the one shown in FIG. 11A and others. Incorporated in the bonding unit 51A are, for example, in the order shown in FIG. 11C, the observation camera 53, electrification preventing device 54, dispenser 55, adhesive sucking device 56, hardening light 57, and warm-air fan 58 which are arranged with a required space between adjoining devices.

Owing to the aforesaid structure, two optical sheet members 6A each shaped like a belt having a predetermined width are joined sequentially. This results in an optical sheet whose width is twice as large as that of the original optical sheet members 6A. When an optical sheet is used as an optical screen on which an image is projected from an image projector, an optical sheet of a required length is cut out from the belt-like optical sheet produced by joining the optical sheet members.

Figure 22A:
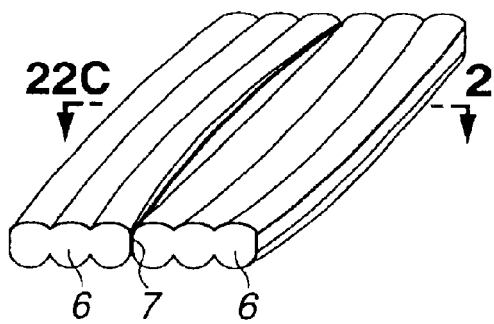
FIG. 22A is a perspective view showing the state of joined optical sheet members that have depressions thereof met each other to define both ends of a joint line, and that are employed in the embodiment.
Figure 22D:
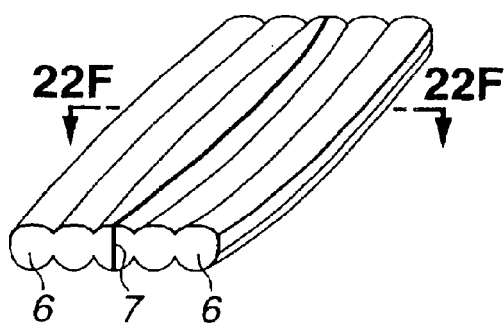
FIG. 22D is a perspective view showing the state of joined optical sheet members that have elevations thereof met each other to define both ends of a joint line, and that are employed in the embodiment.
Figure 22B:
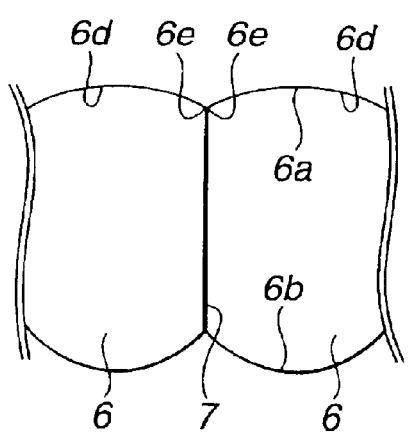
FIG. 22B is an enlarged view showing part of the end surfaces of the optical sheet members shown in FIG. 22A.
Figure 22E:
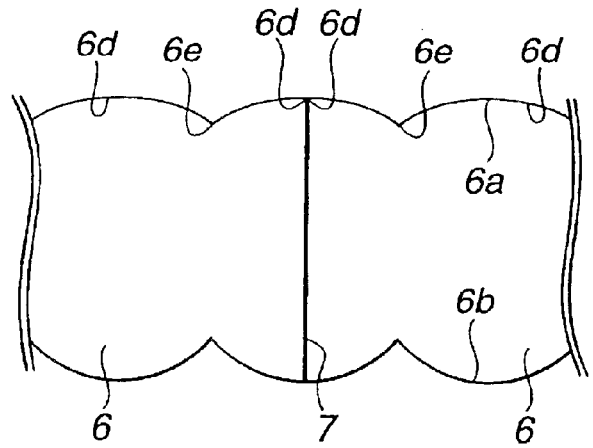
FIG. 22E is an enlarged view showing part of the end surfaces of the joined optical sheet members shown in FIG. 22D.
Figure 22C:
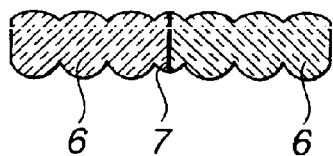
FIG. 22C is a sectional view showing the optical sheet members shown in FIG. 22A.
Figure 22F:
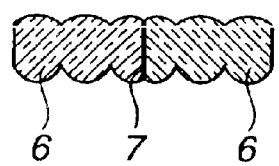
FIG. 22F is a sectional view of the joined optical sheet members shown in FIG. 22D.
Figure 22G:
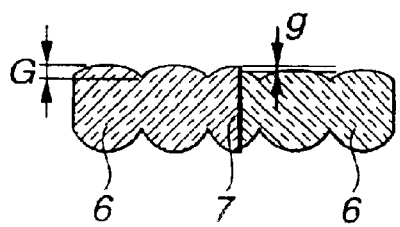
FIG. 22G is a sectional view showing the state of joined optical sheet members that have elevations or depressions thereof met each other to define both ends of a joint line and that are mismatched in the middle of the joint line.

Referring to FIG. 18A to FIG. 22G, the structure of an optical sheet produced according to the aforesaid manufacturing process will be detailed below. FIG. 18A and FIG. 18B are perspective views showing the structure of an optical sheet produced by joining optical sheet members. FIG. 19 is an enlarged view showing joint portions of optical sheet members. FIG. 20A and FIG. 20B show paired and joined optical sheet members that have undulations extended substantially in the same direction on the surfaces thereof. FIG. 21A, FIG. 21B, FIG. 21C, and FIG. 21D show paired and joined optical sheet members that have undulations extended in substantially symmetrical directions on the surfaces thereof. FIG. 22A is a perspective view showing optical sheet members joined with depressions of the surfaces thereof met each other to define both end portions of a joint line. FIG. 22B is an enlarged partial view showing the end surfaces of the optical sheet members shown in FIG. 22A. FIG. 22C is a sectional view showing the optical sheet members shown in FIG. 22A. FIG. 22D is a perspective view showing paired optical sheet members with elevations of the surfaces thereof met each other to define both end portions of a joint line. FIG. 22E is an enlarged partial view showing the end surfaces of the optical sheet members shown in FIG. 22D. FIG. 22F is a sectional view showing the optical sheet members shown in FIG. 22D. FIG. 22G is a sectional view showing a mismatch observed in the middle of a joint line that has both end portions thereof defined with elevations or depressions of the surfaces of optical sheet members which are met to join the optical sheet members.

The optical sheet member 6 has a surface thereof formed by cyclically repeating a predetermined shape with a predetermined pitch between adjoining shapes in at least one direction. For example, the optical sheet member 6 is realized with a lenticular lens sheet formed by juxtaposing a plurality of cylindrical lenses unidirectionally, a film whose refractive index varies alternately streakily, a microlens array having microscopic lenses arranged two-dimensionally, or a concentric Fresnel lens sheet.

When the optical sheet member 6 is realized with, for example, the lenticular lens sheet, the optical sheet member is cut along the axis of any of juxtaposed cylindrical lenses using the optical sheet cutting machine 1, and joined to the other optical sheet member using the optical sheet joining machine 3.

FIG. 18A shows an optical sheet produced by joining the optical sheet members. When the optical sheet member 6 is realized with a lenticular lens sheet, two major surfaces 6a and 6b of the optical sheet member 6 have elevations 6d and depressions 6e extended along the axes of cylindrical lenses thereof. As for the dimensions of the optical sheet member, for example, the maximum thickness H thereof, that is, the length between the elevation 6d of one major surface 6a and the elevation 6d of the other major surface 6b is 0.6 mm. A pitch W between adjoining elevations 6d or depressions 6e is 0.24 mm.

In the illustrated example, the optical sheet member is realized with a lenticular lens sheet having the elevations 6d and depressions 6e formed on the two major surfaces 6a and 6b. Alternatively, a lenticular lens sheet having the elevations and depressions formed on one major surface will be also possible to adopt.

Moreover, for example, when an optical sheet is used as an optical screen, holding pieces 8 serving as reinforcement members may be, as shown in FIG. 18B, attached to the edges of the optical sheet outside an optically effective field (outside a field on which an image is projected) to reinforce the joining surface.

Furthermore, referring to FIG. 12E, when optical sheet members 6 are joined, the adhesive 7 is sandwiched between the end surfaces 6c that may be referred to as joint surfaces. Alternatively, as shown in FIG. 19, the adhesive may also be applied to both surfaces of the optical sheet members over a length corresponding to a range from, for example, 1 pitch to 5 pitches across the joint surfaces of the optical sheet members. Herein, one pitch is a length between adjoining convex or concave parts of one surface of the optical sheet member. The joint portions of the optical sheet members may thus be reinforced. When the transparent adhesive is thus applied to near the joint portions, an optically undesirable effect that may stem from a difference of levels caused by the joint surfaces can be alleviated.

By the way, as mentioned above, the optical sheet member 6 cannot help having some undulations over the concavo-convex surface thereof. When the optical sheet members 6 are joined without any consideration taken into the undulations, since the joint surfaces of the optical sheet members are inconsistent with each other, they are optically mismatched. Consequently, the joint surfaces are visualized as, for example, a streak.

Consequently, when the optical sheet joining machine 3 is used to join optical sheet members, a best-matched pair of optical sheet members 6 is selected based on information concerning the conditions of the surfaces of the optical sheet members 6 cut by the optical sheet cutting machine 1. The selected optical sheet members 6 are then joined.

The best-matched pair of optical sheet members will be described with reference to FIG. 20A, FIG. 20B, FIG. 21A, FIG. 21B, FIG. 21C, and FIG. 21D.

FIG. 20A and FIG. 20B show joining of optical sheet members having undulations extended in substantially the same direction on the surfaces thereof.

As shown in FIG. 20A, the paired optical sheet members 6 each have undulations whose center portions are angled leftward. Assume that the magnitude of undulations occurring on one optical sheet member 6 near the joint surface thereof is x and the magnitude of undulations occurring on the other optical sheet member 6 near the joint surface thereof is y. A pair of optical sheet members to be selected satisfies a condition of $|x-y|<2$ pitches. More preferably, a pair of optical sheet members satisfying a condition of $|x-y|<1$ is selected. In practice, when the pitch W is 0.24 mm as mentioned above, the difference in the magnitude of undulations between optical sheet members should be equal to or smaller than 0.48 mm.

Incidentally, the extent of undulations must be, as shown in FIG. 20B, ranged within a length of, for example, about 1 mm from each of the joint surfaces of optical sheet members.

FIG. 21A, FIG. 21B, FIG. 21C, and FIG. 21D show a pair of optical sheet members having undulations extended in substantially symmetrical directions on the surfaces thereof.

FIG. 21A and FIG. 21B show a case where undulations take place to cause the center portion of the concavity and convexity on the surface of one optical sheet member to recede from the center portion of the concavity and convexity on the surface of the other optical sheet member. FIG. 21C and FIG. 21D show a case where undulations take place to cause the center portion of the concavity and convexity on the surface of one optical sheet member to approach the center portion of the concavity and convexity on the surface of the other optical sheet member.

In both the cases shown in FIG. 21A and FIG. 21B and in FIG. 21C and FIG. 21D, a pair of optical sheet members satisfying a condition of $|x-y|<1.5$ pitches is selected. More preferably, a pair of optical sheet members satisfying a condition of $|x-y|<0.5$ pitches or less should be selected. In practice, when the pitch W is, as mentioned above, 0.24 mm, the difference of the magnitude of undulations between one optical sheet member and the other optical sheet member should be 0.36 mm or less.

FIG. 22A, FIG. 22B, FIG. 22C, FIG. 22D, FIG. 22E, FIG. 22F, and FIG. 22G show a case where the optical sheet members 6 having undulations are joined with depressions 6e, that is, concave parts thereof met each other to define both end portions of a joint line or with elevations, that is, convex parts thereof met each other to define both end portions of a joint line.

FIG. 22A, FIG. 22B, and FIG. 22C show a case where the optical sheet members 6 are joined with depressions 6e, that is, concave parts thereof met each other to define both end portions of a joint line. Because of undulations, the center portion of the joint line is not defined with joining of the depressions 6e but at least the both end portions of the joint line are defined with joining of the depressions 6e.

FIG. 22D, FIG. 22E, and FIG. 22F show a case where the optical sheet members 6 are joined with elevations 6d thereof, that is, convex parts thereof met each other to define both end portions of a joint line. Similarly to the above case, because of undulations, the center portion of the joint line is not defined with joining of the elevations 6d but at least the both end portions of the joint line are defined with joining of the elevations 6d.

The optical sheet members 6 are cut by the optical sheet cutting machine 1 so that the both end surfaces 6c or joint surfaces thereof will be sections of elevations or depressions of the concavo-convex surfaces thereof. Thus, elevations 6d or depressions 6e are met each other to define at least the both end portions of the joint line. Consequently, the optical sheet members to be joined can be optically matched.

At this time, elevations or depressions may not be met each other perfectly to define a joint line. In a case shown in FIG. 22G, assume that the amplitude in a height direction of the convex and concave optical sheet members is G and the magnitude of a mismatch adversely affecting an optical property is g. If g is 50% or less of G, the mismatch is permissible. That is to say, the joint portions of the optical sheet members can be relatively optically well matched, and a joint line defined with joining of the joint portions will not substantially be discerned as a streak.

As mentioned above, the optical sheet member 6 is cut by rotating the wheel cutter 16, which is finished with a grinder particulate of diamond or cubic boron nitride, at a high speed. The roughness of the cut surface of the optical sheet member 6 is Rmax 0.8 S or less. An experiment performed by the present applicant demonstrates that the roughness attained ranges from Rmax 0.1 S to Rmax 0.2 S. Thus, an optical effect to be exerted by the cut surface is minimized.

According to the aforesaid embodiment, an optical sheet member is cut along a cutting band line optimal for joining so that it will have a smooth cut surface. Appropriate optical sheet members are paired and joined using an adhesive. This results in an optical sheet in which the joint portions of the optical sheet members will almost not exert an optically adverse effect.

At this time, when an optical sheet is produced under an environment in which temperature, humidity, and the number of dust particles in the air are controlled, the optical sheet can be produced with higher precision.

Occurrence of undulations on the surface of an optical sheet member during a manufacturing process is unavoidable because of the manufacturing process. However, a position on an optical sheet member at which the optical sheet member is cut is determined discreetly or pairing of optical sheet members is achieved carefully. Consequently, an optical mismatch between joint surfaces attributable to undulations can be reduced to the greatest possible extent.

Having described the preferred embodiments of the invention by referring to the accompanying drawings, it should be understood that the present invention is not limited to those precise embodiments but various changes and modifications thereof could be made by one skilled in the art without departing from the spirit or scope of the invention as defined in the appended claims.

What is claimed is:

1. An optical sheet to be used as a screen on which an image is projected from an image projector, comprising:
    optical sheet members which are substantially identical and which each have a major surface, and whose optical properties over the respective major surfaces vary cyclically along a first direction and are substantially identical along a second direction orthogonal to the first direction;
    wherein a region of the major surface of each of the optical sheet members includes undulations extending along the second direction;
    wherein said optical sheet is produced by joining the plurality of optical sheet members with respective end surfaces thereof which are substantially perpendicular to the respective major surfaces thereof meeting each other as joint surfaces; and
    wherein the undulations of respective ones of the optical sheet members meeting at the joint surfaces have phases which are synchronized with each other so that optical properties of the joint surfaces are substantially identical to each other within a predetermined permissible range.

2. The optical sheet according to claim 1, wherein the cyclically varying optical properties are attained by making surfaces of the optical sheet members which contain the respective major surfaces, cyclically concave-convex in a direction of height of the optical sheet members perpendicular to the respective major surfaces.

3. The optical sheet according to claim 2, wherein the predetermined permissible range within which the optical properties of the joint surfaces are regarded to be substantially identical to each other signifies that a magnitude of a mismatch in a direction of height of the joint surfaces between the end surfaces of the optical sheet members falls within 50% of an amplitude of the cyclically concave-convex surfaces of the optical sheet members.

4. The optical sheet according to claim 1, wherein a magnitude of the undulations corresponds to 2 pitches or less and a basic cycle of variation of the optical properties of the optical sheet members in the first direction corresponds to 1 pitch.

5. The optical sheet according to claim 1, wherein:
    the optical sheet members are joined with a transparent adhesive sandwiched between the joint surfaces thereof;
    a basic cycle of variation of the optical properties of the optical sheet members in the first direction corresponds to 1 pitch; and
    the transparent adhesive is applied to the surfaces of the optical sheet members, which contain the major surfaces thereof, over a width corresponding to a range from 1 pitch to 5 pitches across the joint surfaces, and then hardened.

6. The optical sheet according to claim 1, wherein:
    a roughness of the joint surfaces of the optical sheet members is Rmax 0.8 S or less;
    the optical sheet members are joined with a transparent adhesive sandwiched between the joint surfaces thereof; and
    the adhesive is hardened.

7. The optical sheet according to claim 1, wherein the predetermined permissible range within which the optical properties of the joint surfaces are regarded to be substantially identical to each other signifies that a difference between the optical properties falls within 50% of a cyclic variation of the optical properties.

8. The optical sheet according to claim 1, wherein the phases of undulations are synchronized in order to make the optical properties substantially identical to each other within the predetermined permissible range by pairing respective ones of the optical sheet members that have undulations extended in substantially a same direction relative to the joint surfaces thereof.

9. The optical sheet according to claim 1, wherein the undulations are phased in order to make the optical properties of optical sheet members substantially identical to each other within the predetermined permissible range by pairing respective ones of the optical sheet members that have undulations extended in substantially symmetrical directions relative to the joint surfaces thereof.

* * * * *